(12) United States Patent
Georgeson et al.

(10) Patent No.: US 11,149,718 B2
(45) Date of Patent: Oct. 19, 2021

(54) METHODS AND APPARATUS FOR MAINTAINING AIRFOIL-SHAPED BODY USING CART THAT FOLLOWS TRAILING EDGE

(71) Applicant: The Boeing Company, Chicago, IL (US)

(72) Inventors: Gary E. Georgeson, Tacoma, WA (US); Joseph L. Hafenrichter, Auburn, WA (US)

(73) Assignee: The Boeing Company, Chicago, IL (US)

( * ) Notice: Subject to any disclaimer, the term of this patent is extended or adjusted under 35 U.S.C. 154(b) by 329 days.

(21) Appl. No.: 16/106,560

(22) Filed: Aug. 21, 2018

(65) Prior Publication Data

US 2020/0063717 A1   Feb. 27, 2020

(51) Int. Cl.

| *F03D 80/50* | (2016.01) |
| *G01N 29/22* | (2006.01) |
| *G01N 29/265* | (2006.01) |
| *G01N 29/24* | (2006.01) |
| *F03D 17/00* | (2016.01) |

(52) U.S. Cl.
CPC ........... *F03D 80/50* (2016.05); *G01N 29/225* (2013.01); *G01N 29/265* (2013.01); *F03D 17/00* (2016.05); *G01N 29/2493* (2013.01); *G01N 2291/2694* (2013.01)

(58) Field of Classification Search
CPC ............... G01N 29/225; G01N 29/265; G01N 2291/2694; G01N 29/2493; G01N 29/348; G01N 2291/2693; G01N 2291/106; G01N 29/043; F03D 80/50; F03D 17/00; Y02E 10/72
See application file for complete search history.

(56) References Cited

U.S. PATENT DOCUMENTS

| 3,789,947 A | 2/1974 | Blumrich |
| 4,146,967 A | 4/1979 | Rohner et al. |
| 5,031,458 A | 7/1991 | Young et al. |
| 5,623,107 A | 4/1997 | Patterson, Sr. et al. |
| 5,698,787 A | 12/1997 | Parzuchowski et al. |

(Continued)

FOREIGN PATENT DOCUMENTS

WO   2011107087 A2   9/2011

*Primary Examiner* — Nimeshkumar D Patel
*Assistant Examiner* — Gedeon M Kidanu
(74) *Attorney, Agent, or Firm* — Ostrager Chong Flaherty & Broitman P.C.

(57) ABSTRACT

A motorized rolling maintenance cart that utilizes the angled trailing edge geometry of an airfoil-shaped body (such as a wind turbine blade or rotor blade) to traverse the length of the airfoil-shaped body. The trailing edge-following maintenance cart may be used to carry personnel doing maintenance activities on the blades, such as local repairs or re-painting. In accordance with one aspect, the maintenance cart carries non-destructive inspection sensor units or other maintenance hardware over the surface of the airfoil-shaped body (e.g., in a spanwise direction). In accordance with another aspect, the trailing edge-following maintenance cart is configured to also provide fall protection to one or more independently movable crawler vehicles by means of cables. Alternative embodiments may include only one of the two aspects.

22 Claims, 29 Drawing Sheets

(56) References Cited

U.S. PATENT DOCUMENTS

| | | | |
|---|---|---|---|
| 6,167,760 B1 | 1/2001 | Brunty et al. | |
| 6,220,099 B1 | 4/2001 | Marti et al. | |
| 6,378,387 B1 | 4/2002 | Froom | |
| 6,829,959 B2 | 12/2004 | Gifford et al. | |
| 6,945,111 B2 | 9/2005 | Georgeson | |
| 7,083,383 B2 | 8/2006 | Loftus et al. | |
| 7,231,826 B2 | 6/2007 | Bossi et al. | |
| 7,240,556 B2 | 7/2007 | Georgeson et al. | |
| 7,315,609 B2 | 1/2008 | Safai et al. | |
| 7,337,673 B2 | 3/2008 | Kennedy et al. | |
| 7,562,593 B2 | 7/2009 | Engelbart et al. | |
| 7,626,383 B1 | 12/2009 | Sun et al. | |
| 7,640,811 B2 | 1/2010 | Kennedy et al. | |
| 7,643,893 B2* | 1/2010 | Troy | G05D 1/0234 700/65 |
| 7,716,989 B2 | 5/2010 | Kollgaard | |
| 8,060,270 B2 | 11/2011 | Vian et al. | |
| 8,199,194 B2 | 6/2012 | Troy et al. | |
| 8,347,746 B2* | 1/2013 | Hafenrichter | G01M 5/0075 73/866.5 |
| 8,483,356 B2 | 7/2013 | Bendahan | |
| 8,738,226 B2* | 5/2014 | Troy | B62D 57/024 701/36 |
| 8,743,196 B2 | 6/2014 | Fritz et al. | |
| 8,807,257 B1 | 8/2014 | Hansen et al. | |
| 8,874,371 B2 | 10/2014 | Troy et al. | |
| 8,892,252 B1 | 11/2014 | Troy et al. | |
| 9,156,321 B2 | 10/2015 | Troy et al. | |
| 9,302,787 B2* | 4/2016 | Hafenrichter | B64F 5/30 |
| 9,481,082 B1 | 11/2016 | Hafenrichter et al. | |
| 9,574,549 B2* | 2/2017 | Lee | B08B 7/04 |
| 9,643,313 B2* | 5/2017 | Hafenrichter | B25J 9/02 |
| 9,791,420 B2 | 10/2017 | Holmes et al. | |
| 10,232,897 B2* | 3/2019 | Hafenrichter | B62D 57/032 |
| 10,717,162 B2* | 7/2020 | Hafenrichter | B23Q 9/02 |
| 2002/0036108 A1 | 3/2002 | Jeswine et al. | |
| 2003/0147493 A1 | 8/2003 | Bueno et al. | |
| 2006/0043303 A1 | 3/2006 | Safai et al. | |
| 2006/0055396 A1 | 3/2006 | Georgeson et al. | |
| 2007/0096727 A1 | 5/2007 | Rempt et al. | |
| 2009/0038398 A1 | 2/2009 | Lavoie et al. | |
| 2010/0011864 A1 | 1/2010 | Hanan et al. | |
| 2010/0132137 A1* | 6/2010 | Eggleston | B08B 3/022 15/21.1 |
| 2011/0178727 A1 | 7/2011 | Hafenrichter et al. | |
| 2012/0060611 A1 | 3/2012 | Thommen-Stamenkov et al. | |
| 2012/0153032 A1 | 6/2012 | Svanebjerg et al. | |
| 2013/0024067 A1* | 1/2013 | Troy | B64F 5/30 701/36 |
| 2013/0261876 A1 | 10/2013 | Froom et al. | |
| 2013/0289766 A1 | 10/2013 | Hafenrichter et al. | |
| 2013/0298682 A1 | 11/2013 | Motzer et al. | |
| 2013/0304251 A1 | 11/2013 | Garvey et al. | |
| 2015/0135459 A1* | 5/2015 | Lee | F03D 80/55 15/246 |
| 2015/0267688 A1* | 9/2015 | Krampe | F03D 80/50 701/2 |
| 2016/0334301 A1* | 11/2016 | Hafenrichter | G01M 5/0075 |

* cited by examiner

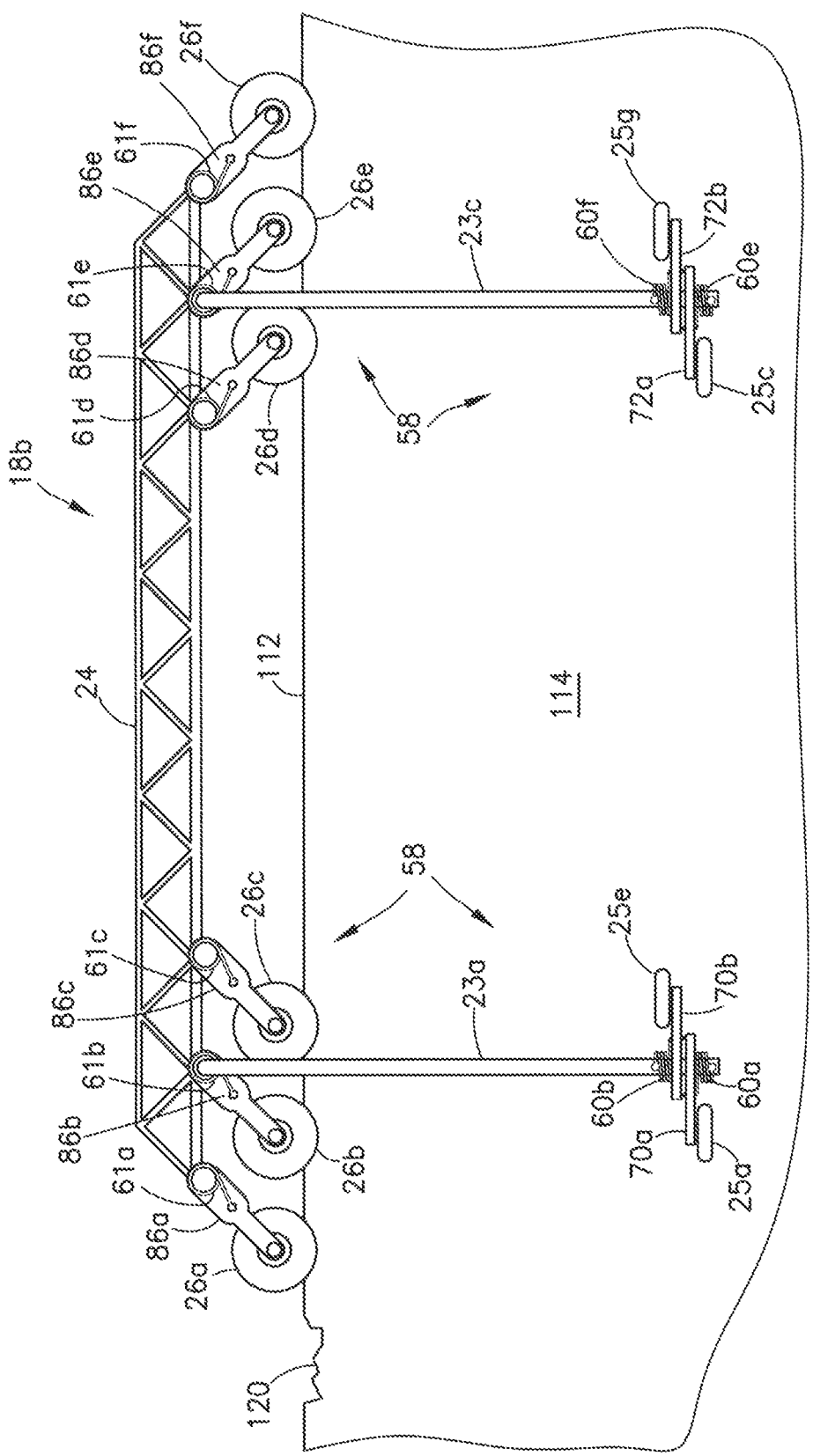

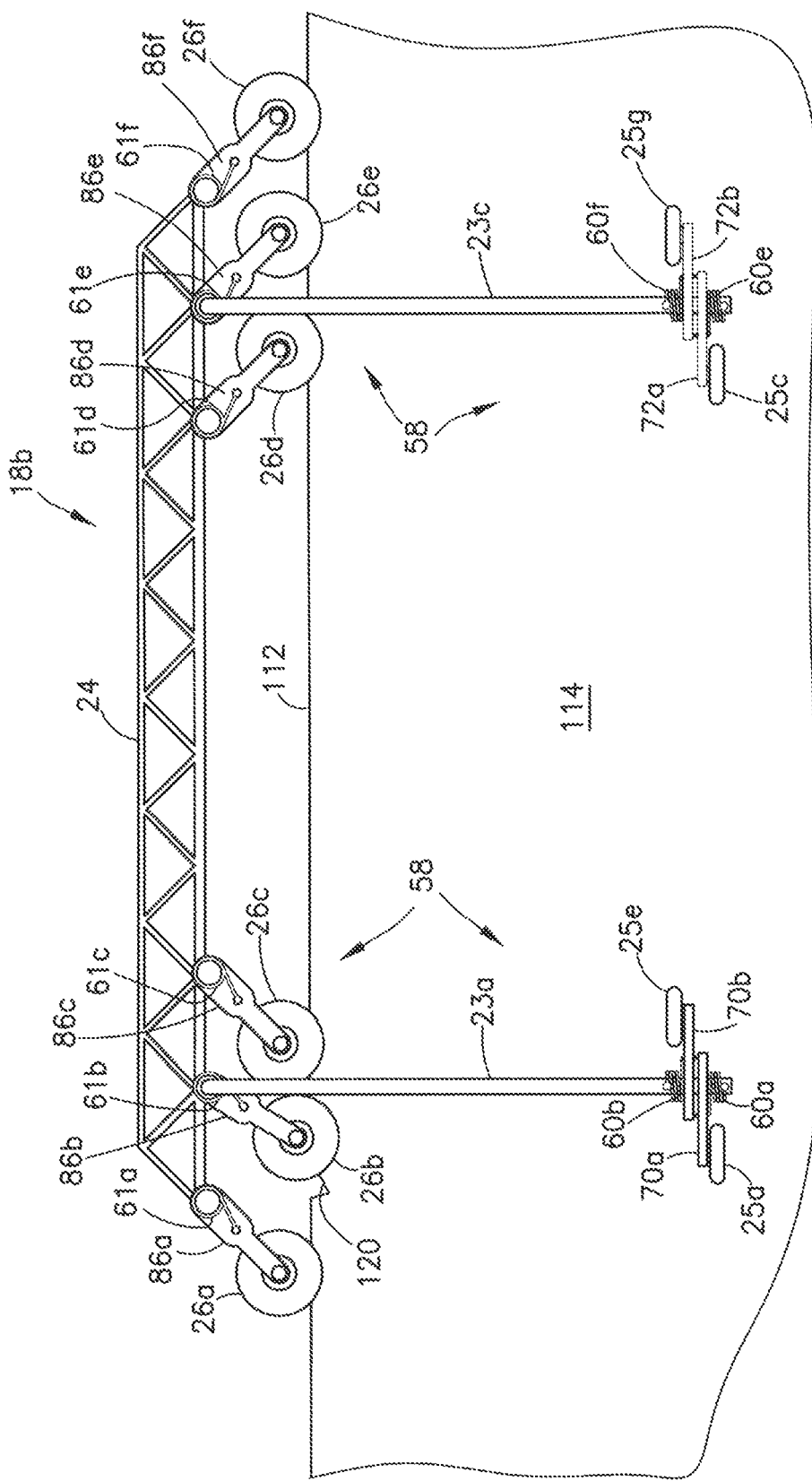

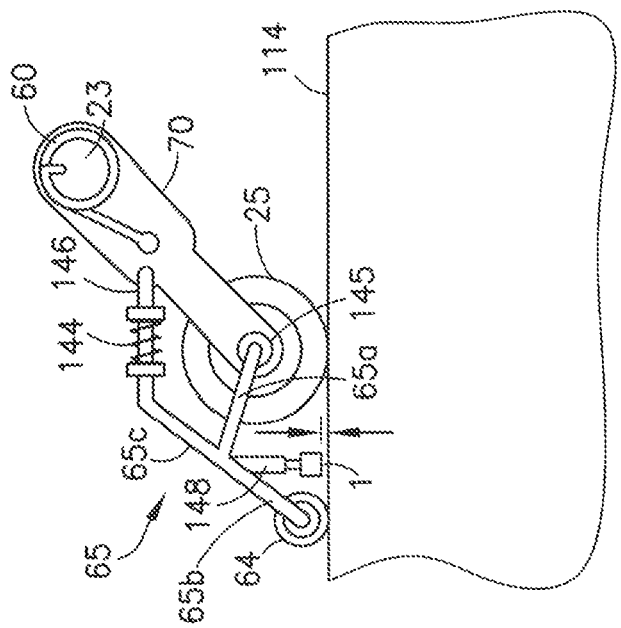
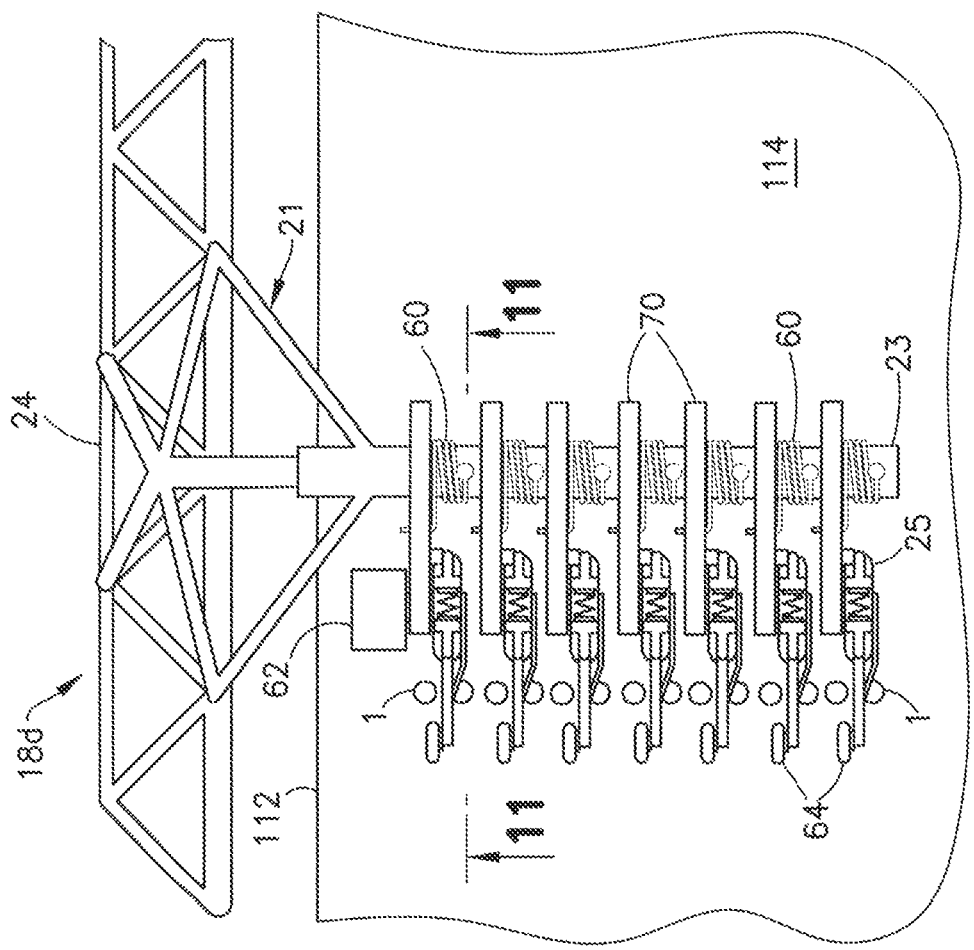
FIG. 11
FIG. 10

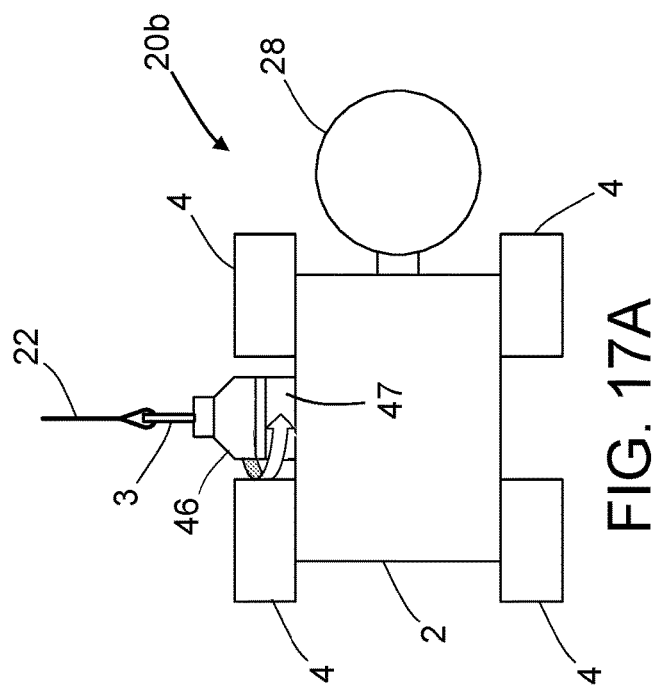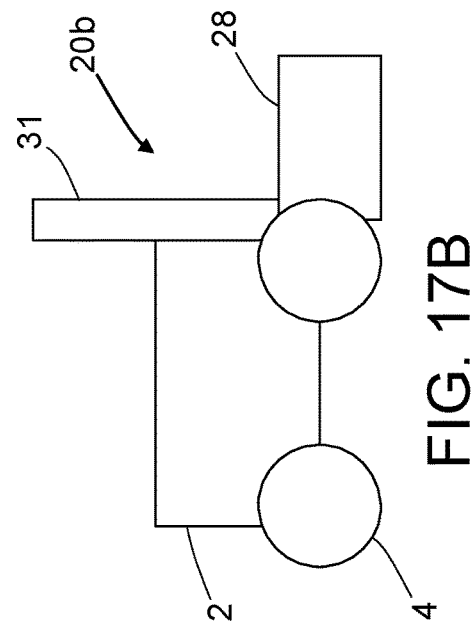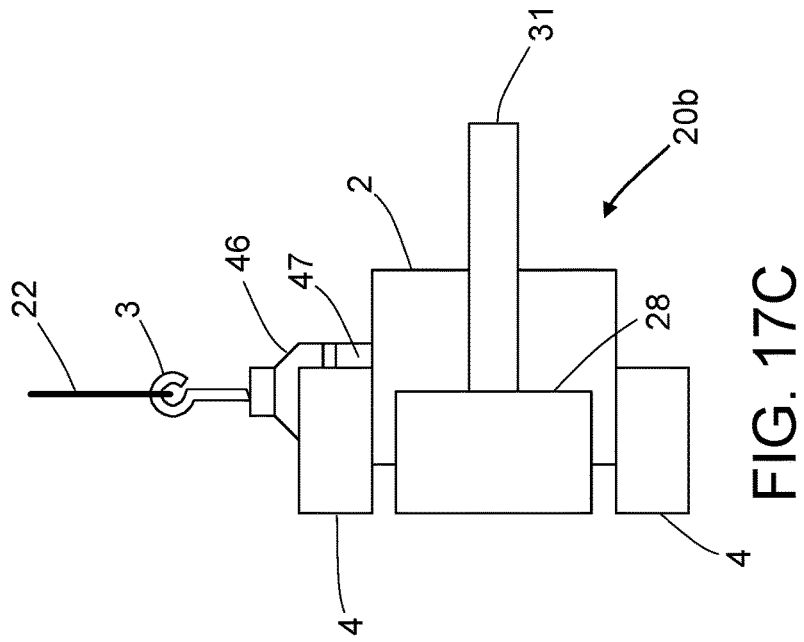

METHODS AND APPARATUS FOR MAINTAINING AIRFOIL-SHAPED BODY USING CART THAT FOLLOWS TRAILING EDGE

BACKGROUND

This disclosure generally relates to automated systems for carrying maintenance tools across surfaces, such maintenance tools including (but not limited to) sensors used in non-destructive inspection (NDI). In particular, this disclosure relates to apparatus for performing automated maintenance operations on airfoil-shaped bodies, such as wind turbine blades and rotor blades.

As used herein, the term "maintenance" includes, but is not limited to, operations such as non-destructive inspection, drilling, scarfing, grinding (e.g., to remove bonded or bolted components), fastening, applique application, ply mapping, cleaning, marking and painting. As used herein, the term "airfoil-shaped body" means an elongated body having two surfaces connecting a leading edge having a curved (e.g., rounded) profile (hereinafter "curved leading edge") to a sharp (e.g., angled) trailing edge (hereinafter "angled trailing edge").

Automated maintenance apparatus designed to traverse wind turbine blades or rotor blades typically needs to avoid attaching to the trailing edge of the blade due to anomalies or irregularities at that location, which make traversing past them problematic. Attachment of a rolling cart to the leading edge of an airfoil-shaped body is done, but this requires sophisticated sensing to keep on track and slippage/falling of the cart is possible if one or more of the scanning systems the cart supports fall off the airfoil-shaped body.

SUMMARY

The subject matter disclosed herein is directed to an apparatus for performing automated maintenance functions on airfoil-shaped bodies, such as a wind turbine blade or a rotor blade, by mounting the apparatus on the trailing edge. The apparatus disclosed herein takes advantage of the sharp angle of the trailing edge to provide the guide/track for a motorized rolling maintenance cart (hereinafter "maintenance cart"). Spring-loaded stabilizing wheels hold the cart in place with a stable orientation while allowing the maintenance cart to travel along the trailing edge over discontinuities and edge features. The multiple stabilizing wheels distribute the load across the blade and are arranged to resist the trailing edge-following maintenance cart falling off of the trailing edge when subjected to imbalance. Powered travel is provided using one or more sets of motorized drive wheels.

The maintenance cart utilizes the angled trailing edge geometry of an airfoil-shaped body (such as a wind turbine blade or rotor blade) to traverse the length of the airfoil-shaped body. The trailing edge-following maintenance cart may be used to carry personnel doing maintenance activities on the blades, such as local repairs or re-painting. In accordance with one aspect, the maintenance cart provides fall protection to one or more tool-equipped crawler vehicles or scanners which are connected to the maintenance cart by cables. In accordance with another aspect, the trailing edge-following maintenance cart is configured and constructed to resist falling off of the trailing edge in the event that one or more tool-equipped crawler vehicles or scanners falls off of the airfoil-shaped body. Alternative embodiments may include one or more of the foregoing aspects.

The trailing edge-following maintenance cart disclosed in some detail below has multiple potential uses, including being a base for crawling or hanging non-destructive inspection (NDI) scanners, holding NDI arrays for inspecting the trailing edge of the blade, and carrying or lowering maintenance-related tools or personnel to locations where a maintenance operation is to be performed. No complex or costly orientation/position or reaction system is needed to keep the cart on the trailing edge of the blade. The system is simple to attach and use. The trailing edge-following maintenance cart resists falling off of the trailing edge, even if one or more tool-equipped crawler vehicles or scanners fall off the blade.

Although various embodiments of an apparatus and methods for performing maintenance operations on an airfoil-shaped body using a trailing edge-following maintenance cart are described in some detail later herein, one or more of those embodiments may be characterized by one or more of the following aspects.

One aspect of the subject matter disclosed in detail below is a method for performing a maintenance operation on an airfoil-shaped body, the method comprising: orienting an airfoil-shaped body so that a trailing edge of the airfoil-shaped body is generally horizontal; placing a maintenance cart having wheels over the trailing edge of the airfoil-shaped body with at least some wheels in contact with first and second side surfaces of the airfoil-shaped body which converge toward the trailing edge; rolling the maintenance cart along the trailing edge of the airfoil-shaped body from a first position to a second position; and performing a maintenance operation on a surface of the airfoil-shaped body after or during the rolling. The maintenance cart is placed so that at least some wheels are in contact with and roll on the trailing edge. In accordance with some embodiments, the wheels in contact with the trailing edge are spring-loaded, and the method further comprises adjusting a vertical position of each wheel in contact with the trailing edge as a vertical position of the contacted portion of the trailing edge changes due to physical anomalies and/or irregularities. The maintenance operation is one of the following different types: non-destructive inspection, drilling, grinding, deburring, reaming, fastening, applique application, scarfing, ply mapping, marking, cleaning and painting.

In accordance with some embodiments, the maintenance operation is performed by a maintenance tool that is supported by a crawler vehicle, the crawler vehicle being connected to the maintenance cart by a cable. In this case, the method may further comprise: (a) moving the crawler vehicle to a first position in contact with the first side surface; (b) activating a maintenance tool onboard the crawler vehicle to perform a maintenance operation on the first side surface at the first position; (c) upon completion of steps (a) and (b), moving the crawler vehicle from the first position to a second position on a leading edge of the airfoil-shaped body; (d) moving the crawler vehicle from the second position to a third position in contact with the second side surface; and (e) activating the maintenance tool to perform a maintenance operation on the second side surface at the third position.

Another aspect of the subject matter disclosed in detail below is an apparatus comprising: a backbone structure; a suspension system comprising first through fourth suspension arms fixedly coupled to and extending downward from the backbone structure; and first through fourth stabilizing wheels respectively supported by and rotatable relative to the first through fourth suspension arms; and a motor operatively coupled to drive rotation of the first stabilizing wheel. The first through fourth stabilizing wheels are arranged relative to the backbone structure in a configuration such that wherein the first through fourth stabilizing wheels are arranged relative to the backbone structure in a configuration such that the first and third stabilizing wheels would contact and be rollable on one side of an airfoil-shaped body and the second and fourth stabilizing wheels would contact and be rollable on another side of the airfoil-shaped body while the suspension system suspends the backbone structure over a generally horizontal trailing edge of the airfoil-shaped body. In accordance with some embodiments, the suspension system further comprises: first and second rocker arms respectively rotatably coupled to the first and second suspension arms, the first and second stabilizing wheels being respectively rotatably coupled to the first and second rocker arms; and first and second rocker helical torsion springs which are arranged to respectively assist rotations of the first and second rocker arms that would cause the first and second stabilizing wheels to respectively move toward each other.

In accordance with one embodiment of the apparatus described in the immediately preceding paragraph, the apparatus further comprises: first and second vertical wheels, and the suspension system further comprises: third and fourth rocker arms rotatably coupled to the backbone structure, the first and second vertical wheels being rotatably coupled to the third and fourth rocker arms respectively; and third and fourth rocker helical torsion springs which are arranged to respectively assist rotations of the third and fourth rocker arms that would cause the first and second vertical wheels to move away from the backbone structure.

In accordance with some embodiments, the suspension system further comprises: a standoff support frame rotatably coupled to the first rocker arm; a sensor coupled to the standoff support frame; a standoff wheel rotatably coupled to the standoff support frame, wherein the sensor is separated from a plane that is tangent to both the first stabilizing wheel and the standoff wheel by a standoff distance.

In accordance with some embodiments, the apparatus further comprises: first and second NDI sensor unit supports rotatably coupled to the backbone structure; first and second NDI sensor units respectively fixedly coupled to the first and second NDI sensor unit supports; and third and fourth rocker helical torsion springs which are arranged to respectively assist rotations of the first and second NDI sensor unit supports that would move the first and second NDI sensor units away from each other. In accordance with other embodiments, the first through fourth stabilizing wheels are wheel probes. In accordance with the embodiments disclosed herein, the apparatus further comprises one or more tool-carrying crawler vehicles connected to the backbone structure by respective cables.

A further aspect of the subject matter disclosed in detail below is a method for performing a maintenance operation on an airfoil-shaped body having first and second side surfaces that meet at an angled trailing edge and are connected by a curved leading surface, comprising: orienting an airfoil-shaped body so that a trailing edge of the airfoil-shaped body is generally horizontal; connecting a crawler vehicle to a maintenance cart using a cable; placing the maintenance cart over the trailing edge of the airfoil-shaped body with at least some wheels of the maintenance cart in contact with the first and second side surfaces of the airfoil-shaped body; vacuum adhering the crawler vehicle to the first side surface of the airfoil-shaped body using suction; and activating a maintenance tool onboard the crawler vehicle to perform a maintenance operation on the first side surface. Optionally, the method further comprises: moving the crawler vehicle along a continuous path that starts on the first side surface, crosses underneath the curved leading edge and ends on the second side surface of the airfoil-shaped body; and activating the maintenance tool onboard the crawler vehicle to perform a maintenance operation on the second side surface.

In accordance with one embodiment of the method described in the immediately preceding paragraph, the method further comprises: moving the maintenance cart along the trailing edge while the crawler vehicles moves independently; and activating a maintenance tool that is depending from and supported by the maintenance cart to perform a maintenance operation on the second side surface while the maintenance cart is moving. In one proposed implementation, the amount of cable that is wound on a spool is changed as the crawler vehicle crosses underneath the leading edge.

Other aspects of an apparatus and methods for performing automated maintenance operations on an airfoil-shaped body using a trailing edge-following maintenance cart are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 5A through 5E are diagrams representing respective front views of the apparatus depicted in FIG. 4 at five instants in time as some vertical wheels traverse an irregularity in the trailing edge.

FIG. 10 is a diagram representing a front view of a portion of a trailing edge-following apparatus in accordance with a fourth embodiment.

FIG. 11 is a diagram representing a cross-sectional view of a portion of the apparatus depicted in FIG. 10, the apparatus being sectioned in the plane indicated by the line 11-11 in FIG. 10.

FIG. 17A is a diagram representing a top view of a cable-suspended, vacuum-adhered, tool-equipped crawler vehicle in accordance with one embodiment.

FIGS. 17B and 17C are side and end views respectively of the cable-suspended, vacuum-adhered, tool-equipped crawler vehicle depicted in FIG. 17A.

Reference will hereinafter be made to the drawings in which similar elements in different drawings bear the same reference numerals.

DETAILED DESCRIPTION

As used herein, the term "airfoil-shaped body" refers to an elongated body having a curved leading edge and an angled trailing edge connected by a pair of side surfaces, such as a wind turbine blade or a rotor blade. The cross-sectional profile of the airfoil-shaped body may change in size and shape from the root to the tip. A blade maintenance tool is a device that performs a maintenance operation, such as non-destructive inspection of an airfoil-shaped body, or cleaning of an external surface of the airfoil-shaped body, while travelling along the airfoil-shaped body.

For the purpose of illustration, apparatuses and methods for performing automated maintenance operations on a wind turbine blade using a trailing edge-following maintenance cart will now be described in some detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
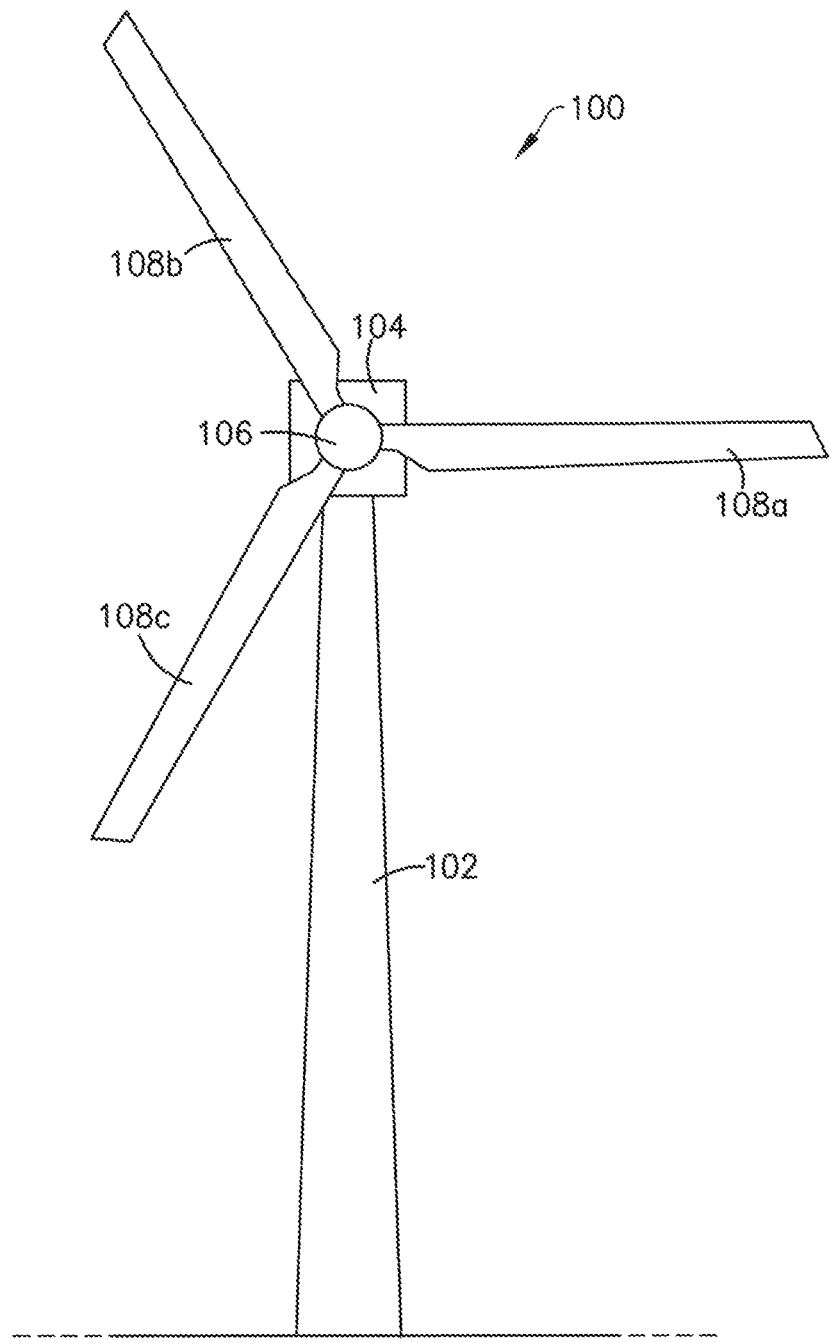
FIG. 1 is a diagram representing a front view of a typical wind turbine.

FIG. 1 is a diagram representing a front view of a typical wind turbine 100. A typical wind turbine 100 has three wind turbine blades 108a-108c extending radially outward from a central hub 106, to which the roots of the wind turbine blades 108a-108c are attached. The hub 106 is rotatably coupled to a nacelle 104 that is supported at a height above ground by a tower 102. The wind turbine blades 108a-108c are configured to generate aerodynamic forces that cause the wind turbine to rotate in response to wind impinging on the blade surfaces. The nacelle 104 houses an electric generator (not shown in FIG. 1) which is operatively coupled to the hub 106. The electric generator is configured to generate electrical power as the hub 106 rotates.

Figure 2:
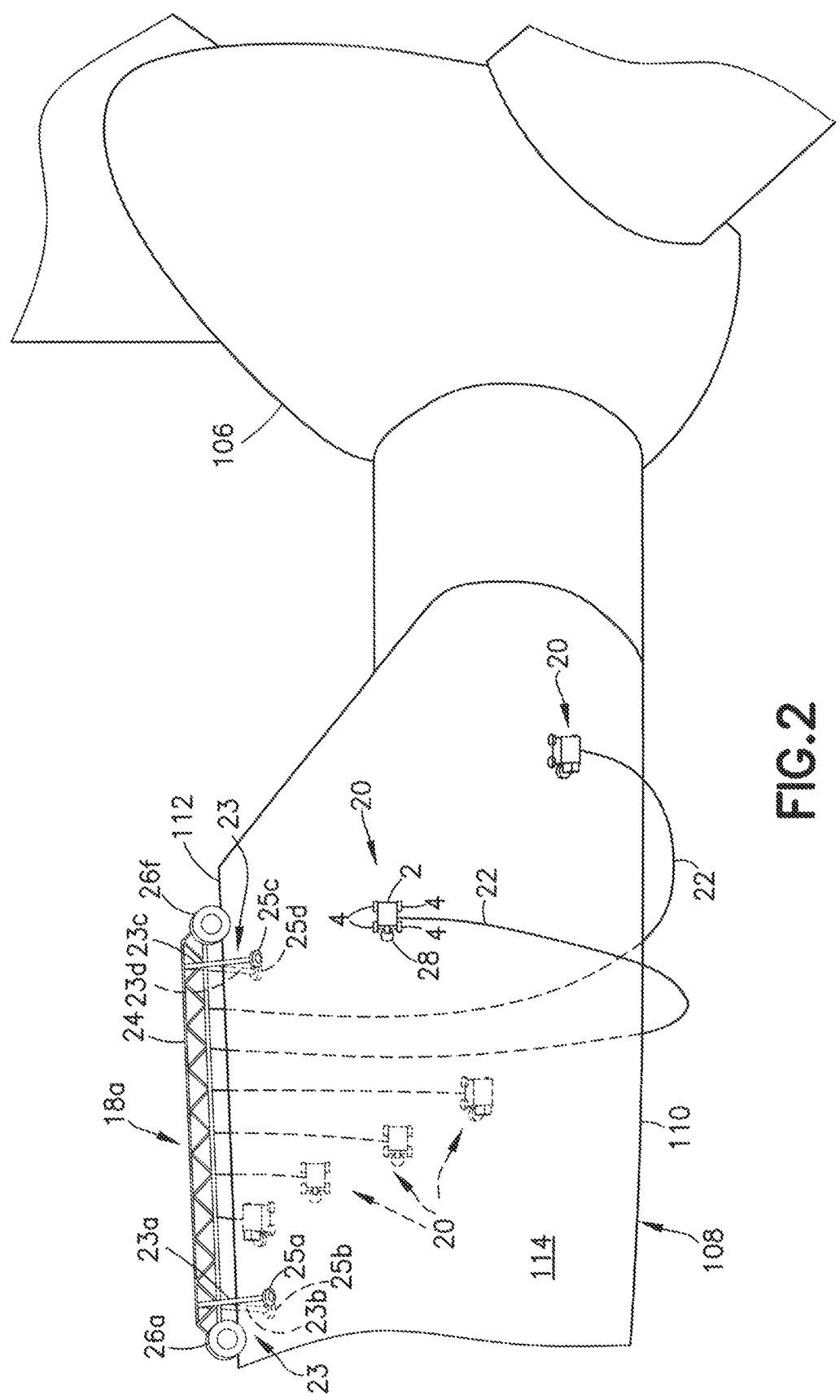
FIG. 2 is a diagram representing a view of an apparatus in accordance with a first embodiment placed on a generally horizontal trailing edge of a wind turbine blade for performing a maintenance operation.

FIG. 2 is a diagram representing a view of a portion of a typical wind turbine 100 having an apparatus that has been placed on a wind turbine blade 108 for performing a maintenance operation in accordance with one embodiment. The wind turbine blade 108 includes two side surfaces 114 and 116 (only side surface 114 is visible in FIG. 2) which in profile converge to form a leading edge 110 and an acute angle having the trailing edge 112 at the vertex. When the wind turbine 100 operates, foreign matter or debris may become attached to the surfaces 114 and 116 of the wind turbine blades 108. Also cracks or scratches may occur in the wind turbine blades 108 during usage. Foreign matter on the surface of the wind turbine blades 108 may degrade the efficiency of the wind turbine 100; cracks may propagate if not attended to. Periodic maintenance may be performed for removing foreign matter from the surfaces of the wind turbine blades 108 or for detecting anomalies (e.g., cracks) in the wind turbine blades 108.

In accordance with the particular embodiment depicted in FIG. 2, the maintenance cart 18a includes a backbone structure 24 (e.g., in the form of a truss bridge) and a pair of vertical wheels 26a and 26f rotatably coupled to the backbone structure 24. The vertical wheels 26a and 26f are configured to follow the trailing edge 112. The axes of rotation of the vertical wheels 26 may be perpendicular to the trailing edge 112 to facilitate cart travel along the trailing edge 112. The vertical wheels 26a and 26f of the maintenance cart 18a may be made of a material having a high frictional force, such as rubber, so that vertical wheels 26a and 26f are disinclined to slide off of the surface of the trailing edge 112.

Still referring to FIG. 2, the maintenance cart 18a further includes a suspension system 23 that includes first through fourth suspension arms 23a-23d fixedly coupled to and extending downward from the backbone structure 24; first through fourth stabilizing wheels 25a-25d respectively supported by and rotatable relative to the first through fourth suspension arms 23a-23d; and one or more cart drive motors (not shown in FIG. 2, but see cart drive motor 62 in FIG. 16) for driving rotation of respective stabilizing wheels. The first through fourth stabilizing wheels 25a-25d are arranged relative to the backbone structure 24 in a configuration such that: (1) the first stabilizing wheel 25a and third stabilizing wheel 25c contact and are rollable on side surface 114 of the wind turbine blade 108; and (2) the second stabilizing wheel 25b and fourth stabilizing wheel 25d contact and are rollable on side surface 116 of the wind turbine blade 108, upon which the first through fourth suspension arms 23a-23d hold the backbone structure 24 in a position overlying the generally horizontal trailing edge 112 of the wind turbine blade 108, as depicted in FIG. 2.

The apparatus depicted in FIG. 2 further includes a multiplicity of cables 22 depending from the maintenance cart 18a and a multiplicity of crawler vehicles 20 (e.g., holonomic-motion crawler vehicles) respectively attached to the multiplicity of cables 22. The crawler vehicles 20 may move independently of the maintenance cart 18a because each crawler vehicle 20 is vacuum adhered to a surface of the wind turbine blade 108. Each crawler vehicle 20 comprises a frame 2, a set of wheels 4 rotatably coupled to the frame 2, and a maintenance tool 28 mounted to the frame 2. Other components of the crawler vehicle 20 will be described later with reference to those drawings in which the described part is represented.

The control system that controls the apparatus depicted in FIG. 2 may be programmed to move and activate the multiplicity of maintenance tools 28 on the swarm of crawler vehicles 20 in a coordinated manner to scan respective surfaces concurrently on one or both sides of the wind turbine blade 108. As seen in FIG. 2, the crawler vehicles 20 may be positioned at different elevations and may pass under the leading edge 110 during transit from one side of the wind turbine blade 108 to the other side. In accordance with the embodiment depicted in FIG. 2, each crawler vehicle 20 is connected to the maintenance cart 18a by a single cable 22 which acts as a tether that prevents the crawler vehicle 20 from falling to the ground in the event that the suction devices cease to operate or produce insufficient suction force. The trailing edge-following maintenance cart 18a resists falling off of the trailing edge 112, even if one or more tool-equipped crawler vehicles 20 or scanners fall off the blade, thereby producing a state of cart imbalance.

At the start of a maintenance operation, the crawler vehicles 20 may be lowered to respective positions having different elevations, as depicted in FIG. 2. As will be described in more detail later with reference to FIGS. 19-22, each crawler vehicle 20 further comprises suction means for enabling vacuum adherence to the side surfaces 114 and 116 of the wind turbine blades 108. Maintenance operations may be performed while the crawler vehicles 20 are adhered to the side surfaces 114 and 116. During such maintenance operations, the maintenance cart 18a may be either stationary or moving. To maintain slack in the cables during relative movement of the maintenance cart 18a and the crawler vehicles 20, the cables 22 are wound or unwound from respective cable spools 52 (see, e.g., cable spool 52 in FIG. 15 or FIG. 18) as needed.

In accordance with some embodiments, the crawler vehicles 20 are configured to be capable of holonomic motion. A holonomic-motion system is one that is not subject to motion constraints. As used in this disclosure, a vehicle is considered to be holonomic if the controllable degrees of freedom are equal to the total degrees of freedom. This type of system can translate in any direction while simultaneously rotating. This is different than most types of ground vehicles, such as car-like vehicles, tracked vehicles, or wheeled differential-steer (skid-steer) vehicles, which cannot translate in any direction while rotating at the same time.

The maintenance tool 28 carried by the crawler vehicle 20 may be selected from a group of interchangeable maintenance tools, including NDI sensors of different types (e.g., an ultrasonic transducer array, an infrared thermography unit, a video camera, an optical three-dimensional coordinate measuring machine or a laser line scanner), a cleaning unit, and so forth. In accordance with one implementation, the apparatus comprises a multiplicity of crawler vehicles 20 capable of supporting any one of a plurality of maintenance tools 28 for performing a set of maintenance functions on a wind turbine blade. As described in some detail below, the maintenance cart may also carry one or more tools selected from the same group of interchangeable maintenance tools. As a whole, the apparatus disclosed herein reduces maintenance time, labor hours and human errors and increases safety when robotic maintenance functions are performed on wind turbine blades.

As will be described in some detail below during disclosure of various embodiments, the crawler vehicles—although connected to the cart by a cable—are independently movable while vacuum adhered to the surface in which the wheels are in contact. The vacuum adherence functionality of the crawler vehicle is provided by one or more vacuum adherence devices that enable each crawler vehicle to adhere to but still translate and/or rotate over the surface to which the crawler vehicle is adhered. Each vacuum adherence device is designed to "float" when the vacuum adherence device is partially evacuated. The vacuum adherence device includes suction components which are compliant (spring loaded) with low-friction pads that slide across the surface. The system is rotationally compliant as well as compliant along the Z-axis. The resulting total suction force is strong enough to adhere the crawler vehicle to the structure, but not so strong as to inhibit lateral displacement or rotation. Thus, the term "adherence" as used herein means a floating adherence that allows the crawler vehicles to move over a surface while remaining adhered. In contrast, the term "attachment" as used herein includes non-floating adherence (a.k.a. adhesion) and does not include floating adherence.

The automated maintenance tool-carrying apparatus proposed herein takes advantage of the sharp angle of the trailing edge to provide the guide/track for the maintenance cart. In the embodiments described below, the stabilizing wheels 25a-25d are spring-loaded to maintain a stable cart orientation while allowing powered travel of the maintenance cart along the trailing edge over discontinuities and edge features. The multiple stabilizing wheels distribute the load across the blade. Powered travel is provided using one or more motorized drive wheels. The maintenance cart can perform multiple tasks, including being a base for crawling or hanging NDI scanners, holding NDI arrays for trailing edge inspection, and carrying or lowering into position maintenance-related tools or personnel to maintenance locations on the blade. No complex or costly orientation/position or reaction system is needed to keep the maintenance cart on the edge of the blade. The trailing edge-following maintenance cart resists falling off the trailing edge, even if its entire scanning package/scanners, maintenance tool carrier, etc., falls off the blade.

In accordance with some embodiments, a set of compliant vertical wheels seated on the trailing edge of the blade can be used for driving the maintenance cart or maintaining cart height on the trailing edge, and these vertical wheels are designed to easily pass over anomalies or other irregularities at the trailing edge. To maintain control of the cart vertical position, and to prevent bottoming out of the springs on the follower wheels, the following additional technical design features are proposed herein: (a) use soft vertical wheels on the trailing edge; (b) make at least one pair of opposing stabilizing wheels (driver or follower) fixed, with the other pair of opposing stabilizing wheels being spring-loaded, which would keep the maintenance cart from sinking too low on the chord; and (c) limit the amount of travel that the rocker arms could experience, either by the increasing resistance of the helical torsion springs as they rotate, or through hard stops on each rocker arm to limit travel.

Figure 3:
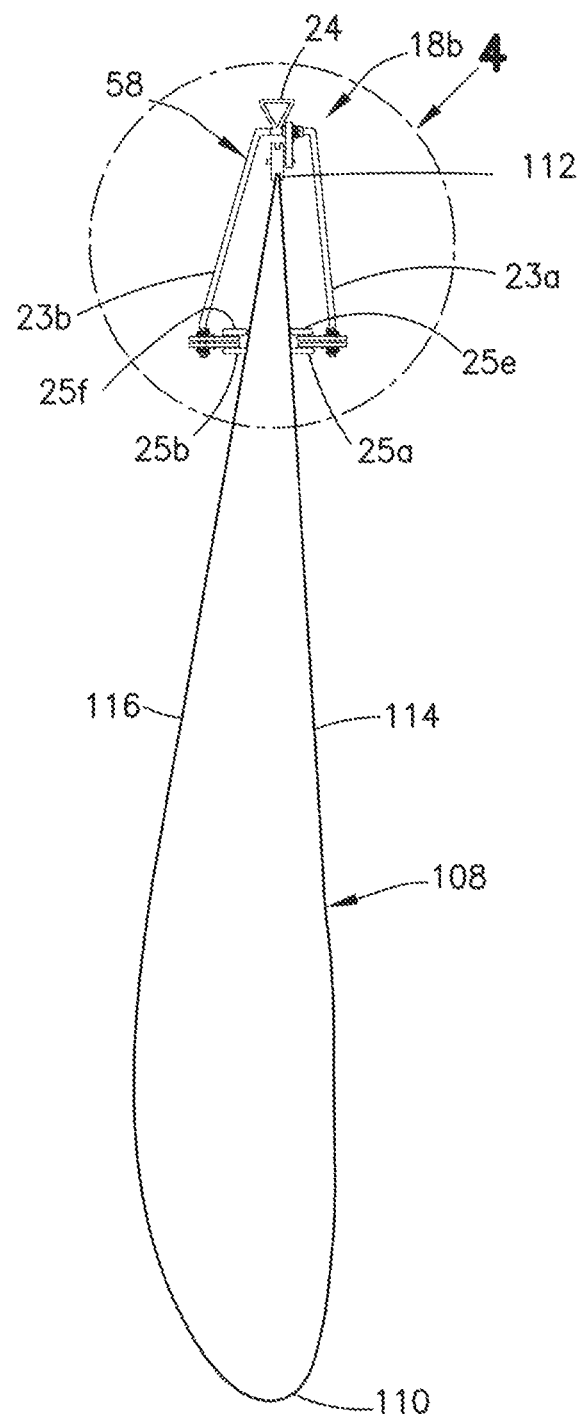
FIG. 3 is a diagram representing an end view of an apparatus in accordance with a second embodiment placed on a generally horizontal trailing edge of a wind turbine blade for performing a maintenance operation.
Figure 4:
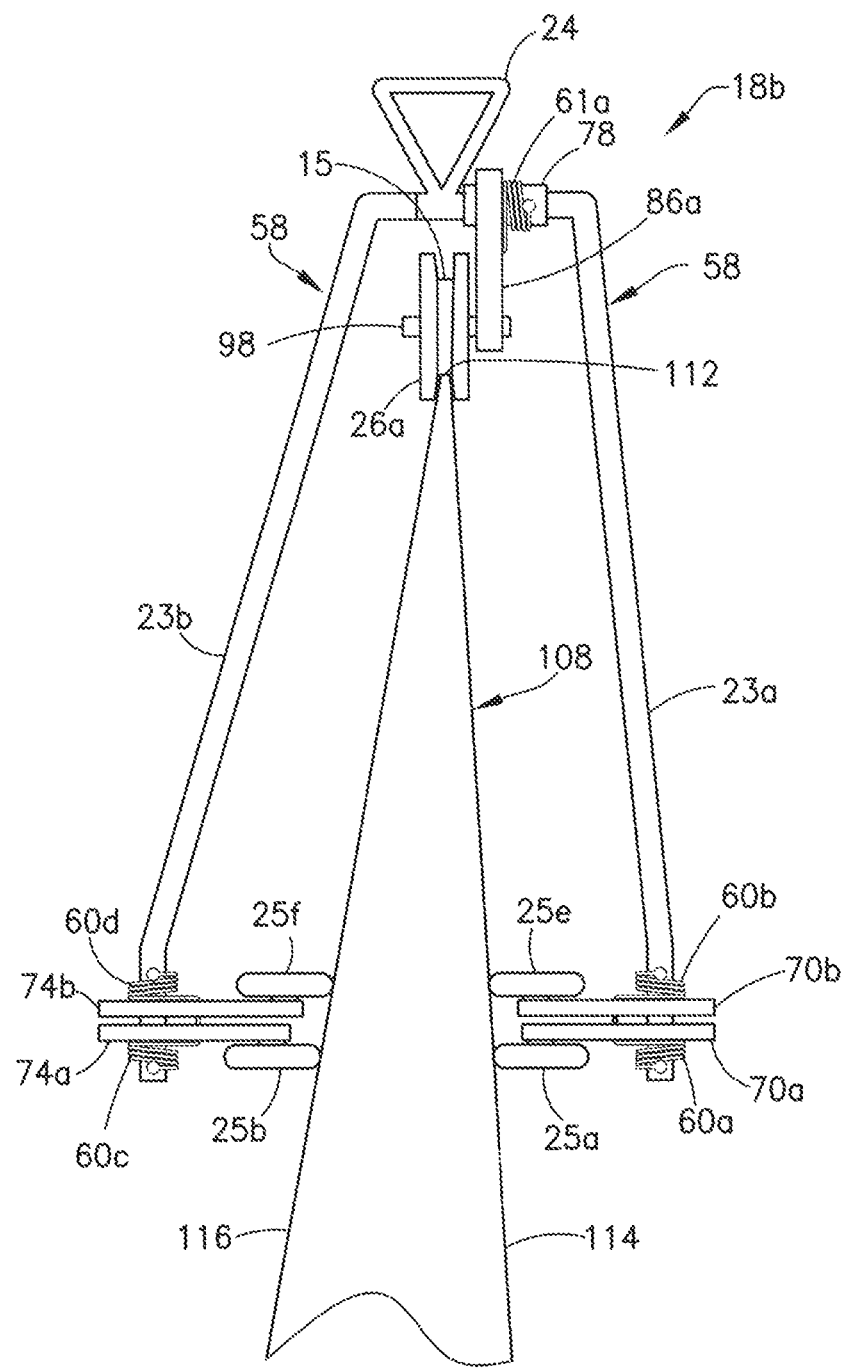
FIG. 4 is a diagram representing a magnified view of a portion of FIG. 3 that includes the generally horizontal trailing edge of the wind turbine blade and a maintenance cart placed thereon.

FIGS. 3, 4 and 5A are diagrams representing respective views of an apparatus in accordance with a second embodiment placed on a generally horizontal trailing edge 112 of a wind turbine blade 108 for performing a maintenance operation. Although not shown in FIGS. 3, 4 and 5A to avoid clutter in the drawings, the apparatus depicted in FIGS. 3, 4 and 5A may optionally include a swarm of crawler vehicles 20 connected by cables 22 to the backbone structure as depicted in previously described FIG. 2. More specifically, FIG. 4 is a diagram representing a magnified view of a portion of FIG. 3 that includes the generally horizontal trailing edge 112 of the wind turbine blade 108 and a maintenance cart 18b placed thereon. FIG. 5A is a diagram representing a front view of the apparatus depicted in FIG. 4. The maintenance cart 18b depicted in FIGS. 3, 4 and 5A has a suspension system 58 that is different than the suspension system 23 of maintenance cart 18a depicted in FIG. 2. The cable management systems of the respective apparatuses depicted in FIGS. 2 and 5A may be the same (described in some detail later with reference to FIG. 15).

Referring to FIGS. 4 and 5A, the maintenance cart 18b includes a backbone structure 24 and two sets of three vertical wheels 26a-26c and 26d-26f rotatably coupled to respective rocker arms 86a-86f by means of respective axles 98 (one of which is shown in FIG. 4). The rocker arms 86a-86f in turn are rotatably coupled to the backbone structure by means of respective axles 78 (one of which is shown in FIG. 4). The axes of rotation of the vertical wheels 26a-26f may be perpendicular to the trailing edge 112 to facilitate cart travel along the trailing edge 112. The vertical wheels 26a-26f of the maintenance cart 18b may be made of a material having a high frictional force so that vertical wheels 26a-26f are disinclined to slide off of the surface of the trailing edge 112. Each of the vertical wheels 26a-26f has an annular groove 15 (see FIG. 4) formed in the outer periphery of the wheel, which groove 15 is configured to receive a portion of the trailing edge 112 of the wind turbine blade 108.

Although the particular embodiment depicted in FIG. 5A has two sets of three vertical wheels 26a-26c and 26d-26f, alternative embodiments may employ more than two sets of vertical wheels. Moreover, each set of vertical wheels may include more than three vertical wheels.

The maintenance cart 18b depicted in FIG. 5A further includes first through fourth suspension arms 23a-23d fixedly coupled to and extending downward from the backbone structure 24; first through fourth pairs of stabilizing wheels respectively supported by and rotatable relative to the first through fourth suspension arms 23a-23d; and one or more cart drive motors (not shown in FIG. 5A, but see cart drive motor 62 in FIG. 16) for driving rotation of respective stabilizing wheels.

As seen in FIGS. 4 and 5A, the first pair of stabilizing wheels 25a and 25e are in contact with and rollable on side surface 114 of the wind turbine blade 108 and the second pair of stabilizing wheels 25b and 25f are in contact with and rollable on side surface 116 of the wind turbine blade 108. As further shown in FIG. 5A, the third pair of stabilizing wheels 25c and 25g are in contact with and rollable on side surface 114 of the wind turbine blade 108. The fourth pair of stabilizing wheels—which are in contact with and rollable on side surface 116 of the wind turbine blade 108—are not visible in either FIG. 4 or FIG. 5A. The first through fourth suspension arms 23a-23d—which respectively couple the four pairs of stabilizing wheels to the backbone structure 24—hold the backbone structure 24 in a suspended position over and above the generally horizontal trailing edge 112 of the wind turbine blade 108, as best seen in FIG. 4.

Referring to FIG. 4, the suspension system 58 further includes rocker arms 70a and 70b, which are respectively rotatably coupled to the first suspension arm 23a, and rocker arms 74a and 74b, which are respectively rotatably coupled to the second suspension arm 23b. The first pair of stabilizing wheels 25a and 25e are respectively rotatably coupled to the rocker arms 70a and 70b; and the second pair of stabilizing wheels 25b and 25f are respectively rotatably coupled to the rocker arms 74a and 74b.

Still referring to FIG. 4, the suspension system 58 further includes helical torsion springs 60a and 60b which are arranged to respectively assist rotations of the rocker arms 70a and 70b that would cause the stabilizing wheels 25a and 25e to move toward stabilizing wheels 25b and 25f. Conversely, the suspension system 58 further includes helical torsion springs 60c and 60d which are arranged to respectively assist rotations of the rocker arms 74a and 74b that would cause the stabilizing wheels 25b and 25f to move toward stabilizing wheels 25a and 25e.

Referring now to FIG. 5A, the suspension system 58 further includes helical torsion springs 60e and 60f which are arranged to respectively assist rotations of the rocker arms 72a and 72b that would cause the stabilizing wheels 25c and 25g to move toward the fourth pair of stabilizing wheels (not visible in FIG. 5A). Conversely, the suspension system 58 further includes a fourth pair of helical torsion springs (not shown in FIGS. 4 and 5A) which are arranged to respectively assist rotations of a fourth pair of rocker arms (not shown) that would cause the fourth pair of stabilizing wheels (not shown) to move toward the stabilizing wheels 25c and 25f.

Figure 5B:
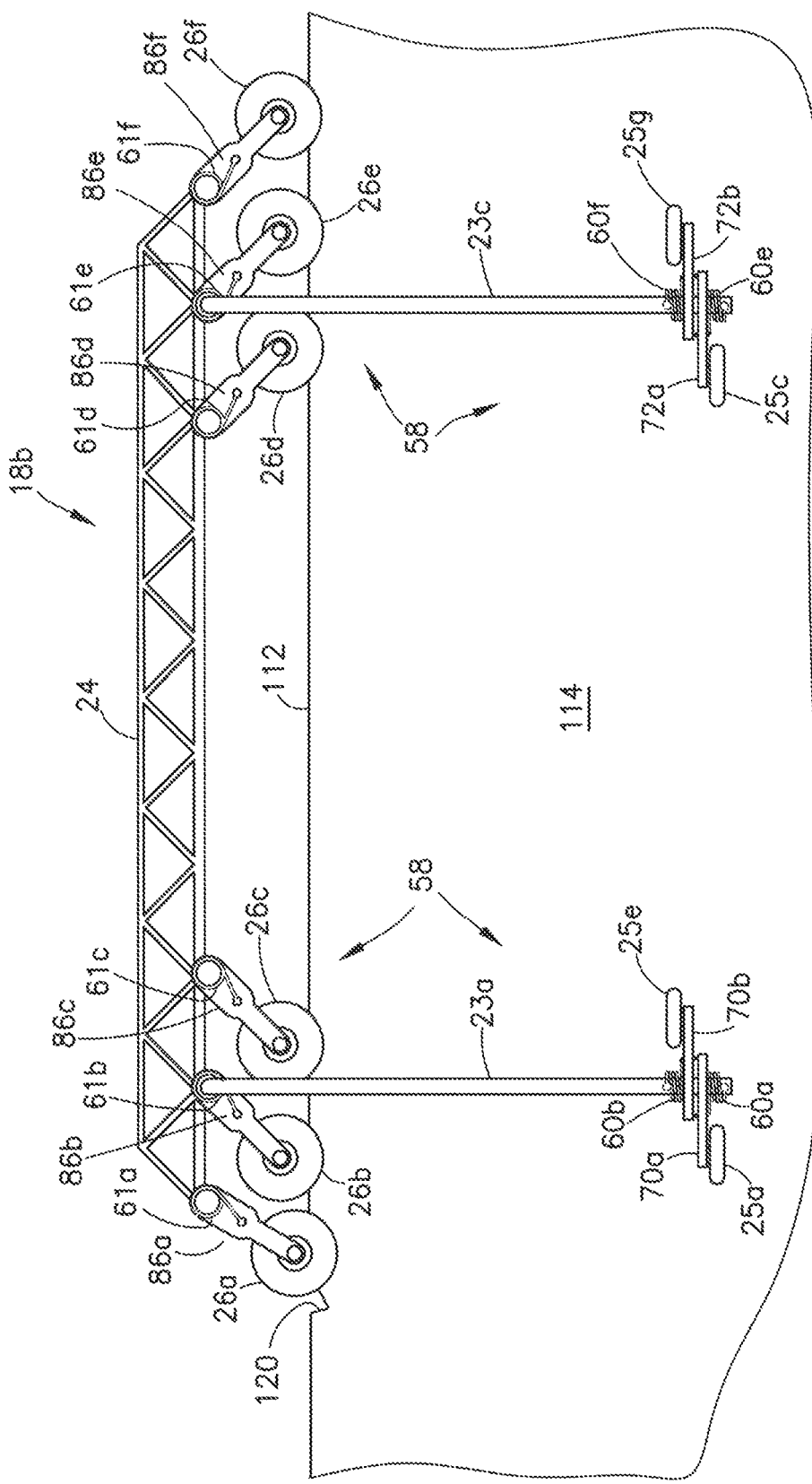

As shown in FIG. 5A, the suspension system 58 further includes rocker arms 86a-86f rotatably coupled to the backbone structure 24. The vertical wheels 26a-26f are respectively rotatably coupled to rocker arms 86a-86f. The suspension system 58 further includes rocker helical torsion springs 61a-61f which are arranged to respectively assist rotations of rocker arms 86a-86f that would cause the vertical wheels 26a-26f to respectively move away from the backbone structure 24. The spring-loaded vertical wheels enable the maintenance cart 18b to traverse anomalies and irregularities formed in the trailing edge 112 of the wind turbine blade, such as irregularity 120 depicted in FIGS. 5A-5E.

Although the embodiment depicted in FIG. 5A has rocker helical torsion springs 61a-61f, which are passive, alternative embodiments may employ an active electrical or pneumatic solenoid or an encoder motor could perform the same function. Each may be controlled by a proximity sensor signaling a controller to articulate the active device.

FIGS. 5A through 5E are diagrams representing respective front views of the apparatus depicted in FIG. 4 at five instants in time as vertical wheels 26a-26c traverse an irregularity 120 in the trailing edge 112. As should be apparent from the preceding description of rocker arms 86a-86c and rocker helical torsion springs 61a-61c, the vertical positions of the vertical wheels 26a-26c may be adjusted to account for local changes in elevation of the trailing edge 112 due to the presence of an irregularity 120 (in this example, a depression) by rotating the associated rocker arms 86a-86c.

At the instant of time depicted in FIG. 5A, the vertical wheel 26a has not yet reached the irregularity 120. At the instant of time depicted in FIG. 5B, the maintenance cart 18b has moved leftward (as viewed in FIG. 5B) until the vertical wheel 26a has rolled into a depression of the irregularity 120. As the vertical wheel 26a rolled into the depression, the rocker arm 86a was urged to rotate counter-clockwise (as viewed in FIG. 5B) by the vertical rocker helical torsion spring 61a, thereby adjusting the vertical position of the vertical wheel 26a downward so that vertical wheel 26a remained in contact with the irregularity 120.

At the instant of time depicted in FIG. 5C, the maintenance cart 18b has moved further leftward (as viewed in FIG. 5C) until the vertical wheel 26a has rolled out of the depression of the irregularity 120. As the vertical wheel 26a rolled out of the depression, the contact force exerted by the trailing edge 112 on the vertical wheel 26a overcame the resistance of the vertical rocker helical torsion spring 61a, which in turn caused the rocker arm 86a to rotate clockwise (as viewed in FIG. 5C). In addition, at the instant of time depicted in FIG. 5C, now the vertical wheel 26b has rolled into the depression. As the vertical wheel 26b rolled into the depression, the rocker arm 86b was urged to rotate counter-clockwise (as viewed in FIG. 5C) by the vertical rocker helical torsion spring 61b, thereby adjusting the vertical position of the vertical wheel 26b downward so that vertical wheel 26b remained in contact with the irregularity 120.

Figure 5D:
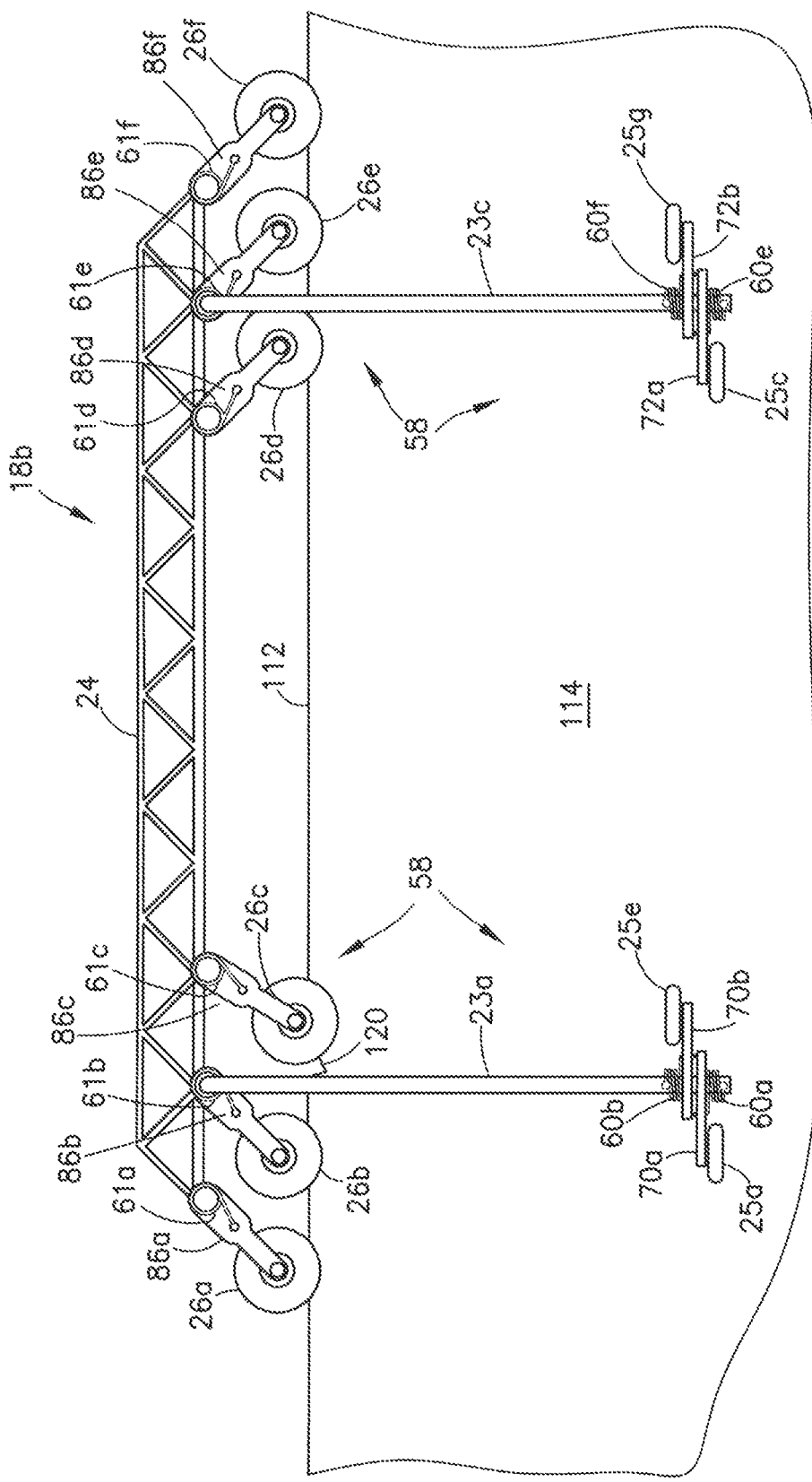

At the instant of time depicted in FIG. 5D, the maintenance cart 18b has moved further leftward (as viewed in FIG. 5D) until the vertical wheel 26b has also rolled out of the depression of the irregularity 120. As the vertical wheel 26b rolled out of the depression, the contact force exerted by the trailing edge 112 on the vertical wheel 26b overcame the resistance of the vertical rocker helical torsion spring 61b, which in turn caused the rocker arm 86b to rotate clockwise (as viewed in FIG. 5D). In addition, at the instant of time depicted in FIG. 5D, now the vertical wheel 26c has rolled into the depression. As the vertical wheel 26c rolled into the depression, the rocker arm 86c was urged to rotate counter-clockwise (as viewed in FIG. 5D) by the vertical rocker helical torsion spring 61c, thereby adjusting the vertical position of the vertical wheel 26c downward so that vertical wheel 26c remained in contact with the irregularity 120.

Figure 5E:
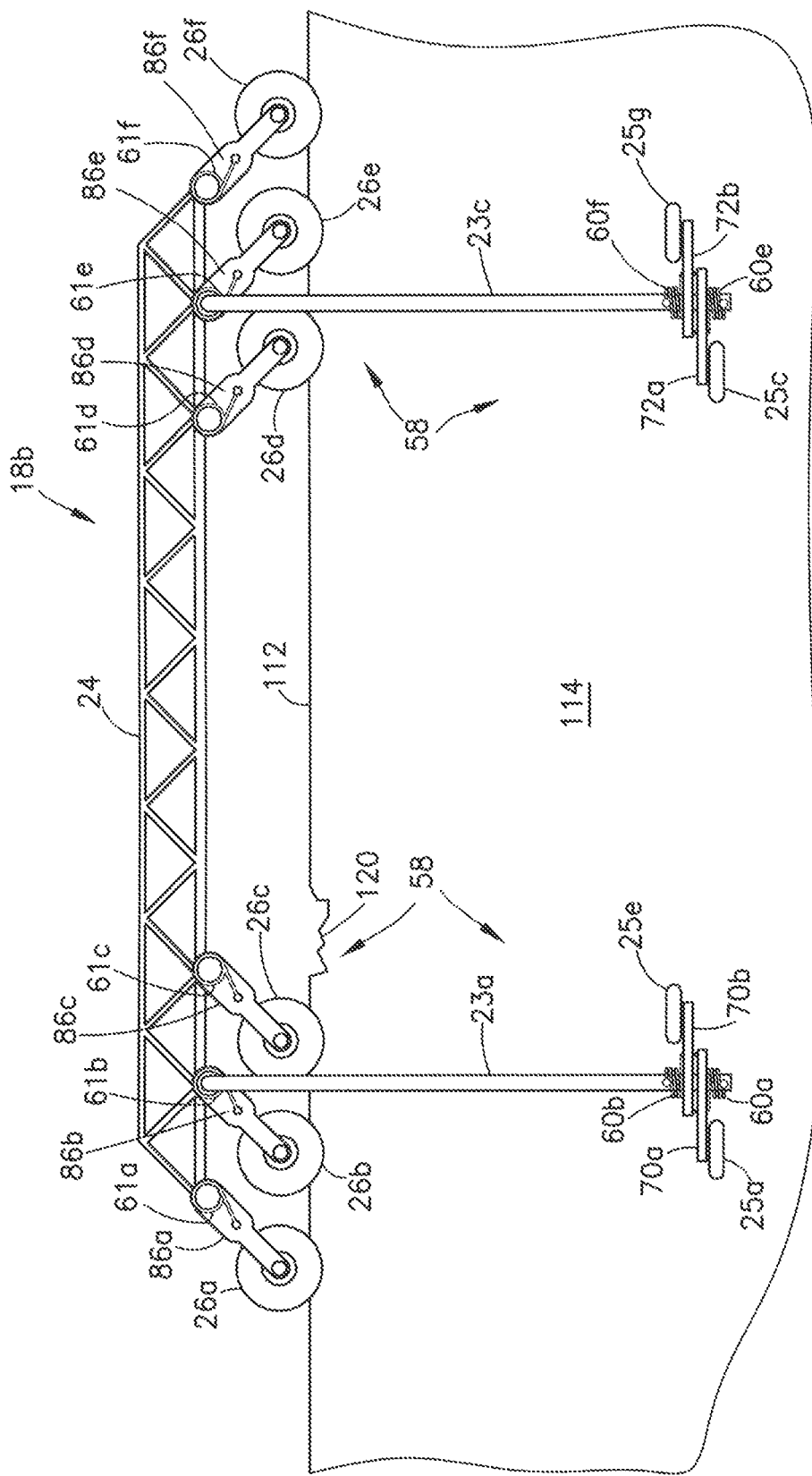

At the instant of time depicted in FIG. 5E, the maintenance cart 18b has moved further leftward (as viewed in FIG. 5E) until the vertical wheel 26c has also rolled out of the depression of the irregularity 120. As the vertical wheel 26c rolled out of the depression, the contact force exerted by the trailing edge 112 on the vertical wheel 26c overcame the resistance of the vertical rocker helical torsion spring 61c, which in turn caused the rocker arm 86c to rotate clockwise (as viewed in FIG. 5E). The vertical wheels 26d-26f may traverse the irregularity 120 in a similar fashion if the maintenance cart 18b continues to move leftward (as viewed in FIGS. 5A-5E).

In accordance with various embodiments disclosed below, the apparatus includes a trailing edge-following maintenance cart having fore and aft maintenance tools for performing maintenance operations on respective areas along the trailing edge of a blade and a multiplicity of maintenance tool-carrying crawler vehicles connected to the cart by means of cables for performing maintenance operations on the remainder of the blade, including the leading edge. After the wind turbine blade 108 is rotated until the trailing edge 112 is oriented generally horizontal and positioned above the leading edge 110 of the same blade, the cart is placed on and able to travel along the trailing edge of the blade. At the same time, the crawler vehicles—which are vacuum adhered to one or both sides of the blade—may be operated independently.

Figure 6:
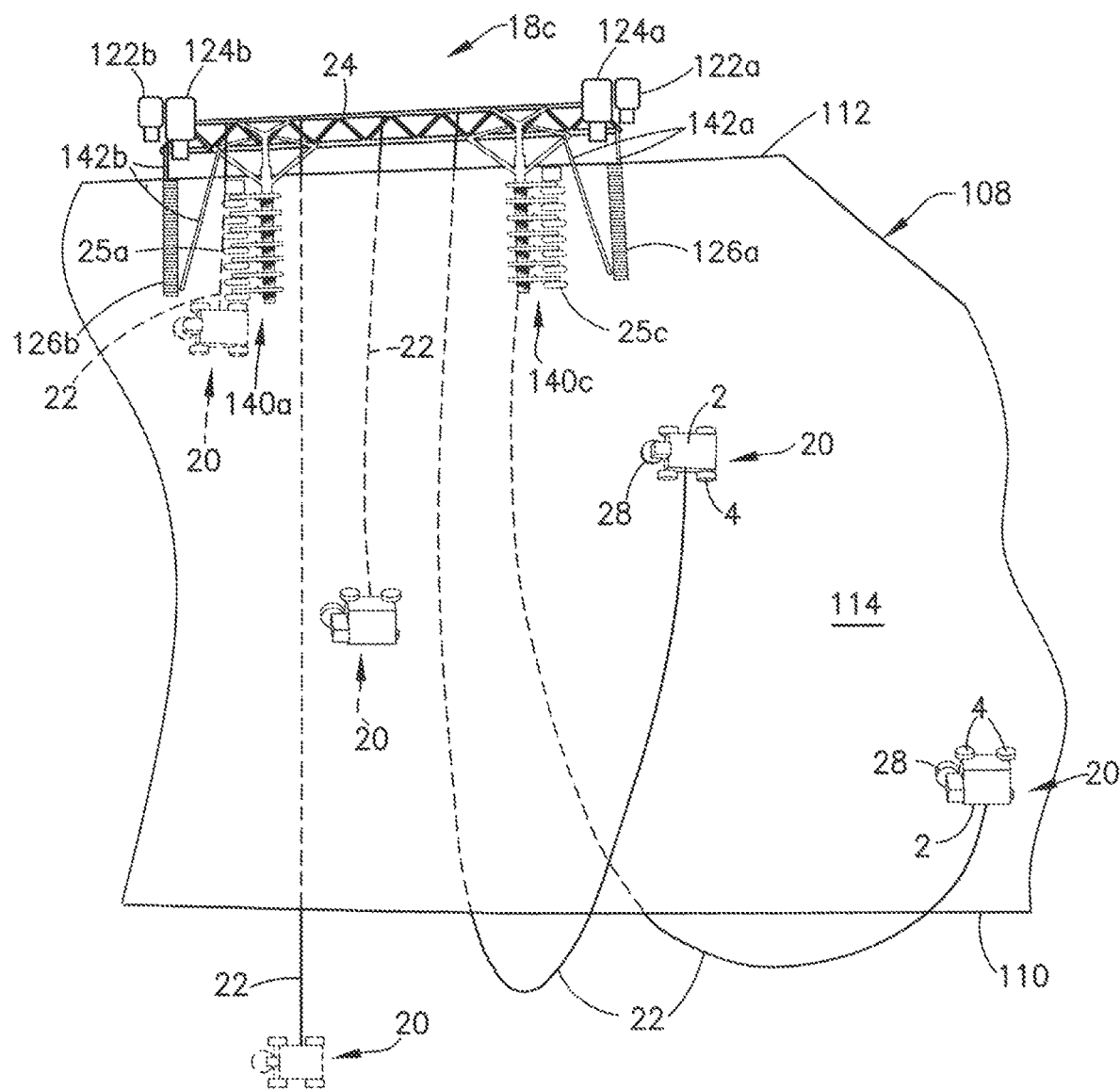
FIG. 6 is a diagram representing a front view of an apparatus in accordance with a third embodiment placed on a generally horizontal trailing edge of a wind turbine blade for performing a maintenance operation.
Figure 7:
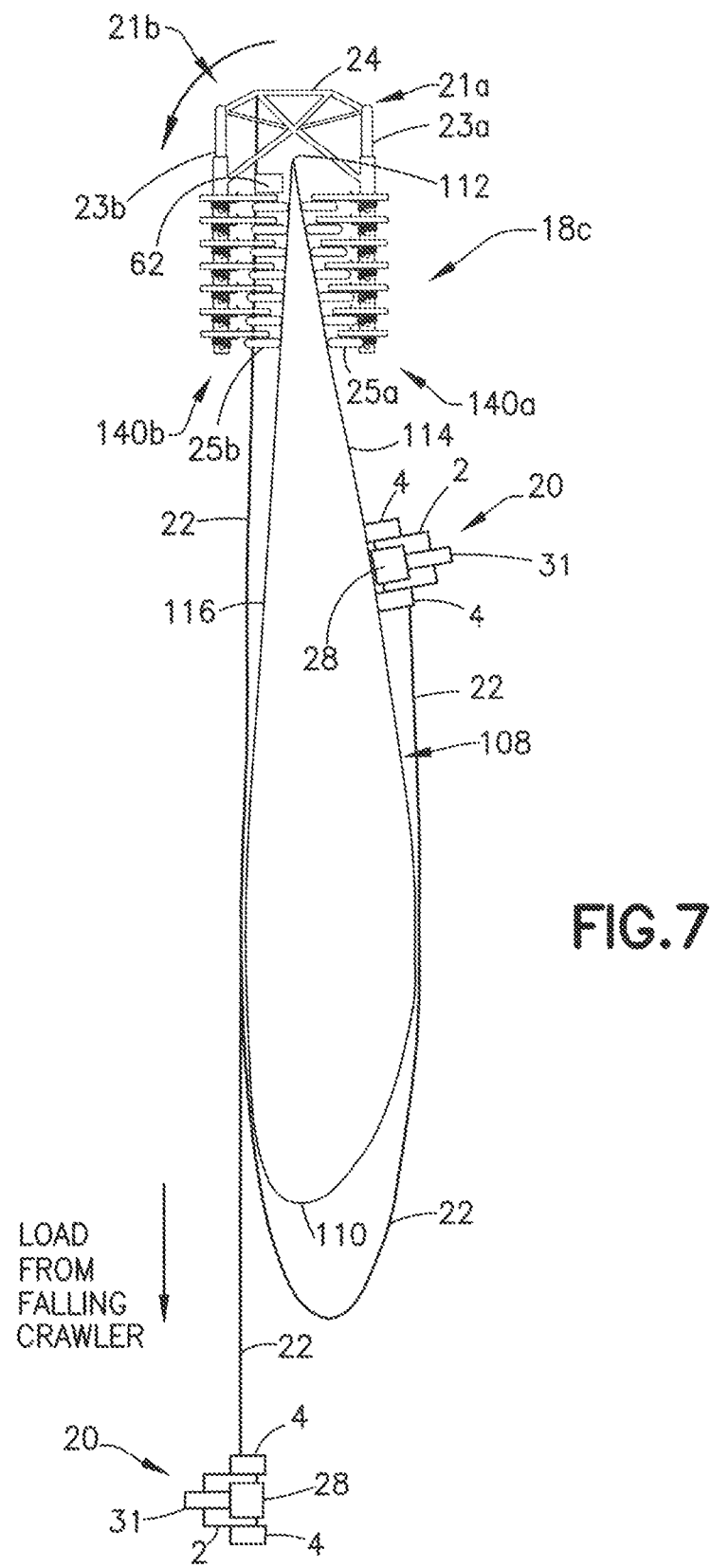
FIG. 7 is a diagram representing an end view of the wind turbine blade with trailing edge-following apparatus depicted in FIG. 6.

FIGS. 6 and 7 are diagrams representing respective views of an apparatus in accordance with a third embodiment placed on a generally horizontal trailing edge 112 of a wind turbine blade 108 for performing a maintenance operation. Although not shown in FIGS. 6 and 7 to avoid clutter in the drawings, the maintenance cart 18c may include two or more vertical wheels of the type depicted in previously described FIG. 5A. Those vertical wheels are coupled to the backbone structure 24 by means of spring-loaded rocker arms of the type previously described with reference to FIG. 5A. In an alternative embodiment, the maintenance cart 18c may have no vertical wheels, in which case the pressure from the stabilizing wheels alone keeps the maintenance cart 18c positioned relative to the trailing edge using the angled component of the normal pressure emanating from the stabilizing wheels (as shown, e.g., in FIG. 2). The cable management systems of the respective apparatuses depicted in FIGS. 5A and 6 may be the same (described in some detail later with reference to FIG. 15). In accordance with the particular embodiment depicted in FIG. 6, the maintenance cart 18c includes a backbone structure 24 and at least two vertical wheels (not shown in FIG. 6) rotatably coupled to the backbone structure 24. The vertical wheels are configured to follow the trailing edge 112, as previously described (see FIG. 4). The maintenance cart 18c further includes: (a) first through fourth suspension subassemblies 140a-140d; (b) first through fourth rows of stabilizing wheels 25a-25d respectively supported by and rotatable relative to the first through fourth suspension subassemblies 140a-140d; and (c) one or more cart drive motors (not shown in FIG. 6, but see cart drive motor 62 in FIG. 16) for driving rotation of respective stabilizing wheels. The first and second suspension subassemblies 140a and 140b and first and second rows of stabilizing wheels 25a and 25b are shown in FIG. 7. The third suspension subassembly 140c and third row of stabilizing wheels 25c are shown in FIG. 6. The fourth suspension subassembly 140*d* and fourth row of stabilizing wheels 25*d* are not visible in FIGS. 6 and 7.

The first through fourth rows of stabilizing wheels 25*a*-25*d* are arranged relative to the backbone structure 24 in a configuration such that the first and third rows of stabilizing wheels 25*a* and 25*c* contact and are rollable on side surface 114 of the wind turbine blade 108 and the second and fourth rows of stabilizing wheels 25*b* and 25*d* contact and are rollable on side surface 116 of the wind turbine blade 108. In this state, the first through fourth suspension subassemblies 140*a*-140*d* hold the backbone structure over and above the generally horizontal trailing edge 112 of the wind turbine blade 108, as depicted in FIG. 7.

The apparatus depicted in FIGS. 6 and 7 further includes a multiplicity of cables 22 depending from the maintenance cart 18*c* and a multiplicity of crawler vehicles 20 (e.g., holonomic-motion crawler vehicles) respectively attached to the multiplicity of cables 22. The crawler vehicles 20 may move independently of the maintenance cart 18*c* because each crawler vehicle 20 is vacuum adhered to a surface of the wind turbine blade 108 and the cables 22 are wound or unwound in a manner that maintains slack in the cables. Each crawler vehicle 20 may be of one of the types described above.

As seen in FIG. 6, the crawler vehicles 20 may be positioned at different elevations and may pass under the leading edge 110 during transit from one side of the wind turbine blade 108 to the other side. In addition, in the event that a crawler vehicle 20 falls off of the wind turbine blade 108 (as depicted in FIG. 7), an unwound portion of a cable 22, that connects the falling crawler vehicle 20 to the backbone structure 24, will become taut and stop the fall of the crawler vehicle 20. FIG. 6 shows a scenario in which the a crawler vehicle 20 is hanging from a taut cable 22 after falling off of the wind turbine blade 108. The downward-pointing straight arrow A in FIG. 7 represents the load produced by a falling crawler vehicle 20; the curved arrow B in FIG. 7 represents the resulting force exerted on the maintenance cart 18*c*. The maintenance cart 18*c* is configured to resist falling off of the trailing edge 112 when the crawler vehicle 20 falls off the wind turbine blade 108. The stabilizing wheels 25*a*-25*d* keep the maintenance cart 18*c* upright. As a result, falling crawler vehicles will not destabilize the maintenance cart 18*c*.

Figure 8:
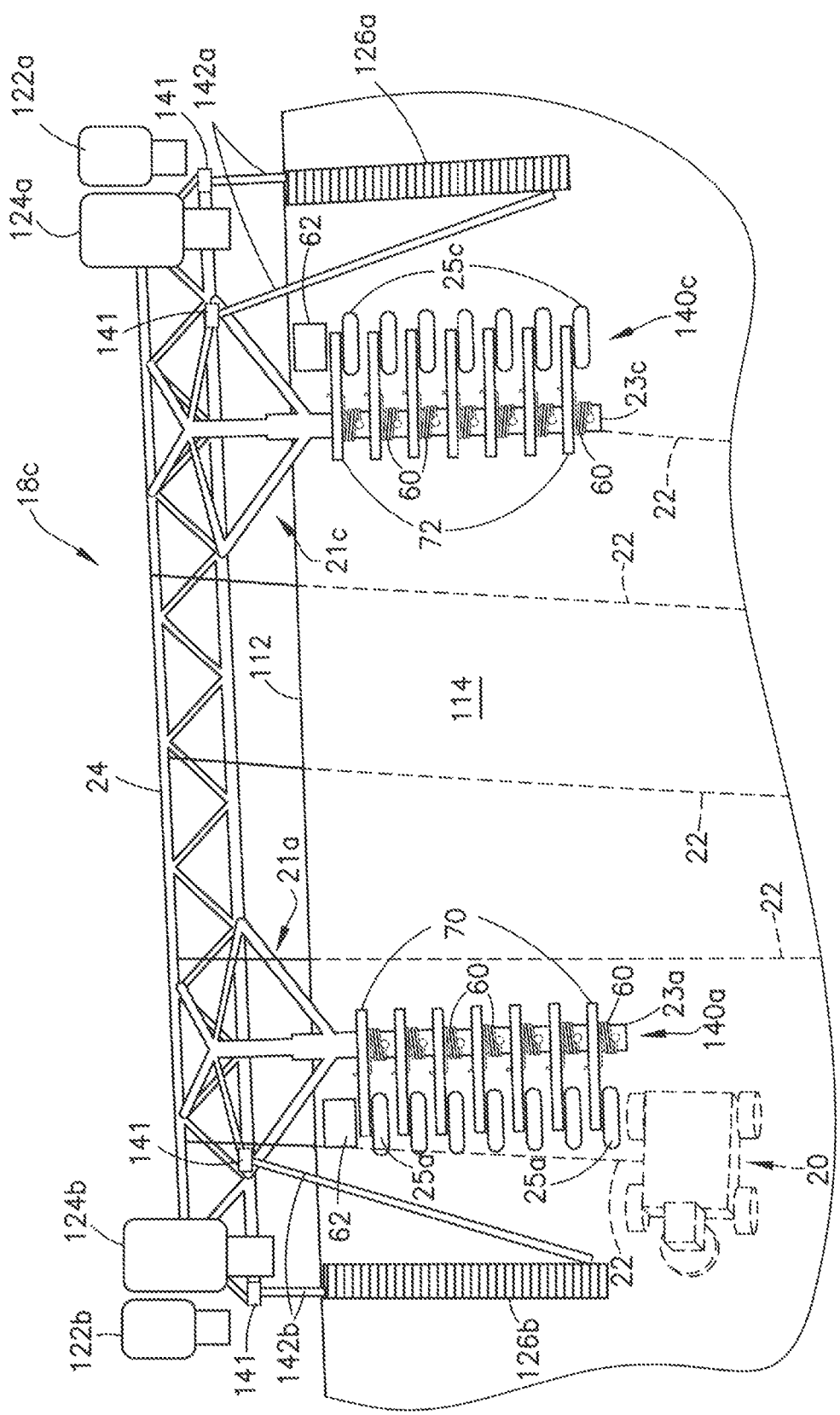
FIG. 8 is a diagram representing a magnified front view of a portion of FIG. 6 that includes the generally horizontal trailing edge of the wind turbine blade and an apparatus in accordance with the third embodiment placed thereon.
Figure 9:
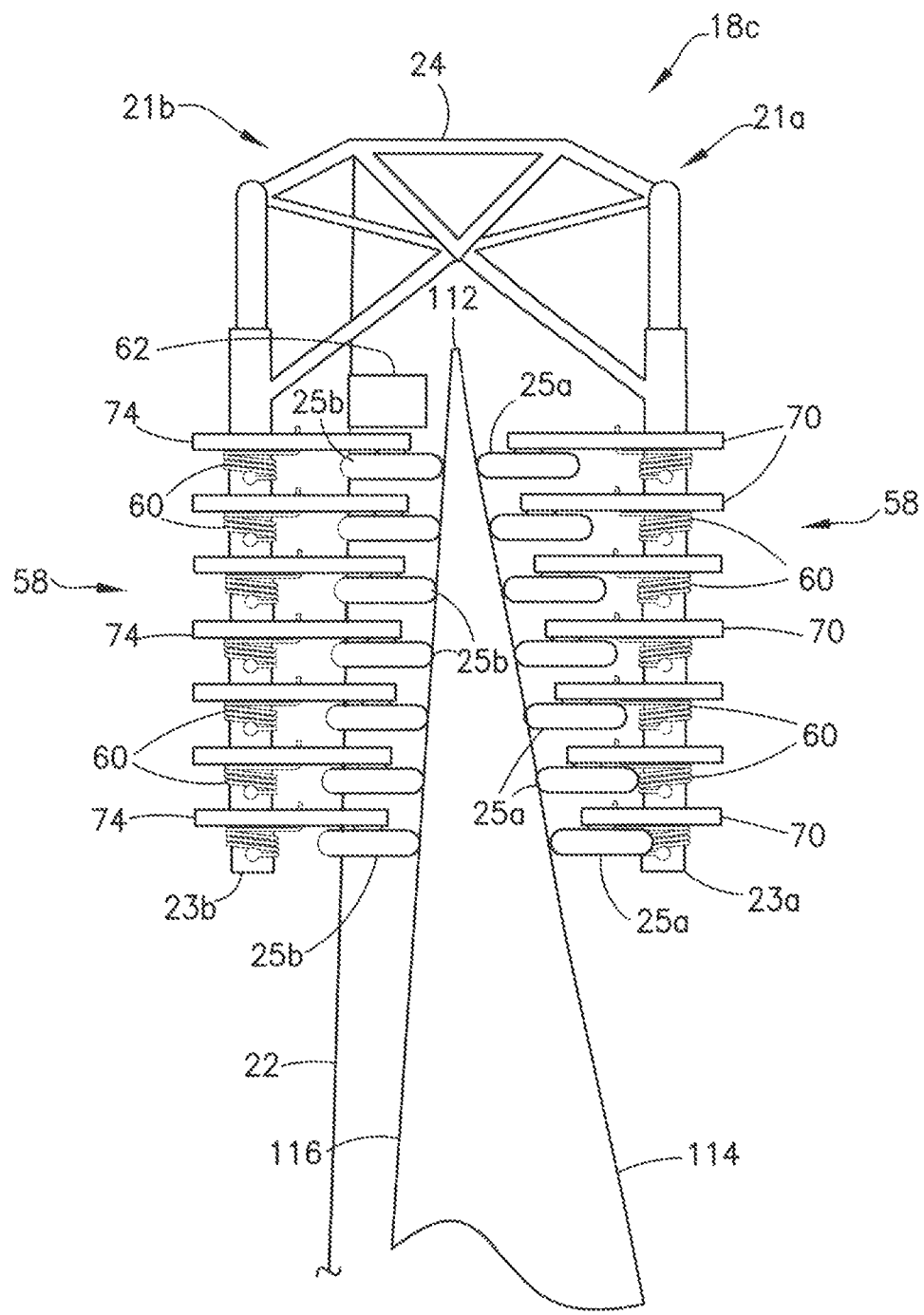
FIG. 9 is a diagram representing an end view of the trailing edge portion of the wind turbine blade and the trailing edge-following apparatus depicted in FIG. 8.

Further details concerning the structure of the apparatus depicted in FIGS. 6 and 7 will now be provided with reference to FIGS. 8 and 9. FIG. 8 is a diagram representing a magnified front view of a portion of FIG. 6 that includes the generally horizontal trailing edge 112 of the wind turbine blade 108 and the trailing edge-following maintenance cart 18*c* placed thereon. FIG. 9 is a diagram representing an end view of the trailing edge portion of the wind turbine blade and the trailing edge-following apparatus depicted in FIG. 8.

As shown in FIGS. 8 and 9, the first suspension subassembly 140*a* includes a first suspension arm 23*a* which is fixedly coupled to the backbone structure 24 by means of a first appendage structure 21*a* and a first row of rocker arms 70 which are rotatably coupled to the first suspension arm 23*a*. The first row of stabilizing wheels 25*a* are respectively rotatably coupled to the first row of rocker arms 70. The suspension subassembly 140*a* further includes a first multiplicity of helical torsion springs 60*a* which are arranged to respectively assist rotations of the rocker arms 70 that would cause the stabilizing wheels 25*a* to move toward stabilizing wheels 25*b*.

As shown in FIG. 9, the second suspension subassembly 140*b* includes a second suspension arm 23*b* which is fixedly coupled to the backbone structure 24 by means of a second appendage structure 21*b* and a second row of rocker arms 74 which are rotatably coupled to the second suspension arm 23*b*. The second row of stabilizing wheels 25*b* are respectively rotatably coupled to the second row of rocker arms 74. The suspension subassembly 140*b* further includes a second multiplicity of helical torsion springs 60*b* which are arranged to respectively assist rotations of the rocker arms 74 that would cause the stabilizing wheels 25*b* to move toward the stabilizing wheels 25*a*.

As shown in FIG. 8, the third suspension subassembly 140*c* includes a third suspension arm 23*c* which is fixedly coupled to the backbone structure 24 by means of a third appendage structure 21*c* and a third row of rocker arms 72 which are rotatably coupled to the third suspension arm 23*c*. The third row of stabilizing wheels 25*c* are respectively rotatably coupled to the third row of rocker arms 72. The suspension subassembly 140*c* further includes a third multiplicity of helical torsion springs 60*c* which are arranged to respectively assist rotations of the rocker arms 72 that would cause the stabilizing wheels 25*c* to move toward the stabilizing wheels 25*d* (not shown in FIGS. 8 and 9).

Although not visible in FIGS. 8 and 9, the fourth suspension subassembly 140*d* may have the same configuration as suspension subassemblies 140*a*-140*c*. As seen in FIGS. 8 and 9, each row of stabilizing wheels 25*a*-25*d* may have at least one stabilizing wheel which is operatively coupled to a respective cart drive motor 62. However, in theory as few as one cart drive motor 62 (of sufficient power) operatively coupled to one stabilizing wheel (having a sufficiently high coefficient of friction with the side surface) may be sufficient under some operating conditions to move the maintenance cart 18*c* along the trailing edge 112.

In addition to the maintenance tools 28 mounted on the crawler vehicles, various maintenance tools (e.g., NDI sensor units) may be mounted to any one of the maintenance carts 18*a*-18*c* described above. In the example depicted in FIG. 8, the maintenance cart 18*c* carries various NDI instruments, including a pair of video cameras 122*a* and 122*b* mounted to the backbone structure 24 and a pair of infrared thermography units 124*a* and 124*b* mounted to the backbone structure 24. Each of the infrared thermography units 124*a* and 124*b* may include a linear heat source for inspection of the trailing edge 112. Another pair of infrared thermography units (not visible in FIG. 8) may be disposed on the other side of the wind turbine blade 108. The video cameras 122*a* and 122*b* check for damage and may also be used to determine when the maintenance cart is near the tip of the wind turbine blade 108.

In the example depicted in FIG. 8, the apparatus further includes a pair of NDI sensor units 126*a* and 126*b* which are rotatably coupled to the backbone structure 24. The NDI sensor units 126*a* and 126*b* may be ultrasonic pulse echo transducer arrays, eddy current arrays, resonance arrays, bond testers or laser probes for acquiring data representing the structural conditions found as the apparatus moves in a spanwise direction over the portion of the side surface 114 which is adjacent to the trailing edge 112. Another pair of NDI sensor units (not visible in FIG. 8) may be disposed on the other side of the wind turbine blade 108. The elements in each array may be arranged in a linear or staggered configuration on a semi-rigid substrate, which semi-rigid substrate is spring loaded to maintain proximity to, if not contact with, the surface being inspected.

In accordance with the embodiment depicted in FIG. 8, the apparatus further includes first and second NDI sensor unit supports 142*a* and 142*b* rotatably coupled to the backbone structure 24 by means of respective pairs of hinges 141; first and second NDI sensor units 126a and 126b respectively fixedly coupled to the first and second NDI sensor unit supports 142a and 142b; and respective helical torsion springs (not shown in FIG. 8) which are arranged to respectively assist rotations of the first and second NDI sensor unit supports 142a and 142b that would move the first and second NDI sensor units 126a and 126b toward the side surface 114 of the wind turbine blade. Third and fourth NDI sensor units may be similarly rotatably coupled to the backbone structure 24 on the other side of the apparatus (behind the wind turbine blade 108 as seen in FIG. 8)

In accordance with one embodiment, each NDI sensor unit 142a and 142b may be a line of non-contact ultrasonic sensors in through-transmission mode from one side to the other. Respective helical torsion springs at the hinges 141 would always rotate the NDI sensor units 142a and 142b toward the wind turbine blade 108. A respective wheel or ball-and-socket bearing on the end of the NDI sensor unit furthest away from the backbone structure 24 could keep a small stand-off distance during cart motion. Airborne ultrasonic testing is non-contact, with the NDI sensor unit being held by the NDI sensor unit supports 142a and 142b at a standoff distance from the side surface 114. Each NDI sensor unit could include a respective column of infrared cameras. High-frequency ultrasonic testing would use a liquid acoustic couplant (e.g., water) that would flow under the array elements spring loaded to touch the surface. A wheel on the end of this array arm is optional, as this would be self-adjusting to the surface along its length.

In accordance with an alternative embodiment, each NDI sensor unit 142a and 142b may be a low-frequency ultrasound (bond tester) array that makes physical contact with the side surface 114, with each array having a spring load to ensure uniform physical contact with the surface being inspected. The low-frequency ultrasonic transducer elements of a bond tester typically each have plastic feet that slide on a surface.

In accordance with other embodiments, respective NDI sensors may be coupled to the rocker arms 70, 72, 74 and 76 that support the stabilizing wheels 25a-25d. For surface areas adjacent to the trailing edge 112 that contain structural anomalies or features that protrude from the surface, each spring-loaded rocker arm holding a stabilizing wheel may also hold a sensor element or short sensor array in proximity to the stabilizing wheel (e.g., alongside or in front of the stabilizing wheel), to be raised if the stabilizing wheel rolls over a protuberance, damage, or non-flat trailing edge feature.

In accordance with one proposed implementation, the sensors are respectively disposed alongside the stabilizing wheels, so that the sensors are lifted with the stabilizing wheels no matter which direction the maintenance cart is moving. A spring load relative to the stabilizing wheel would allow adjustment of the sensor relative to the wheel. While the area directly under each stabilizing wheel is not inspected by the sensors, that would not be an issue if (a) there are also in-wheel sensors, or (b) the wheel is narrow enough so the width of the area missed is less than the anomaly size—so that the anomaly is detected by the array of sensors. This approach significantly simplifies the pick-up of the sensors over protuberances: the sensors go up and down with the stabilizing wheels.

In accordance with an alternative proposed implementation (especially useful for larger surface changes), the sensor may be mounted to a motor-driven linear slide on the arm, enabling the sensor to be lifted above obstacles based upon separate sensing of the surface. A laser line scanner or laser distance meter in front of the sensor could indicate the change in surface height, with a feedback loop through a controller to raise and lower the sensor relative to the adjacent wheel. (Spring loading and angular compliance of the sensor head end effector could still be used to ensure uniform surface contact for this approach.)

FIG. 10 is a diagram representing a front view of a portion of a trailing edge-following apparatus in accordance with a fourth embodiment in which each spring-loaded rocker arm 70 supports a respective pair of NDI sensors 1. FIG. 11 is a diagram representing a cross-sectional view of a portion of the apparatus depicted in FIG. 10, the apparatus being sectioned in the plane indicated by the line 11-11 in FIG. 10.

As best seen in FIG. 11, each rocker arm 70 is urged toward the side surface 114 by a respective rocker helical torsion spring 60. Each stabilizing wheel 25 is mounted to a respective axle 145 that is fixedly coupled to the rocker arm 70. In addition, rocker arm supports a respective pivotable standoff support frame 65 that basically consists of three rigid members 65a-65c connected at an intersection. Rigid member 65a has a distal end rotatably coupled to the end of the axle 145. A standoff wheel 64 is rotatably coupled to a distal end of the rigid member 65b. The distal end of the rigid member 65c is displaceable relative to a standoff spring support 146 that is affixed to the rocker arm 70 and supports a standoff spring 144. The standoff spring 144 may be a compression spring that urges the pivotable standoff support frame 65 to rotate counter-clockwise (as viewed in FIG. 11). This spring loading holds the standoff wheel 64 in contact with the side surface 114, but allows the pivotable standoff support frame 65 to rotate clockwise when the standoff wheel 64 rolls over a protuberance.

In addition, each NDI sensor 1 is mounted to a respective sensor support finger 148 that is affixed to the rigid member 65b and extends downward. Each sensor support finger 148 is configured to hold the NDI sensor 1 at a standoff distance (indicated by opposed arrows in FIG. 11) from the side surface 114. As the standoff wheel 64 rolls over a protuberance, the pivotable standoff support frame 65 rotates clockwise, which lifts the NDI sensor 1 over the protuberance.

In accordance with a further alternative embodiment, the stabilizing wheels may be of a type that incorporates an ultrasonic transducer array, so that no separate sensor is needed; the wheels are the sensors.

Figure 12:
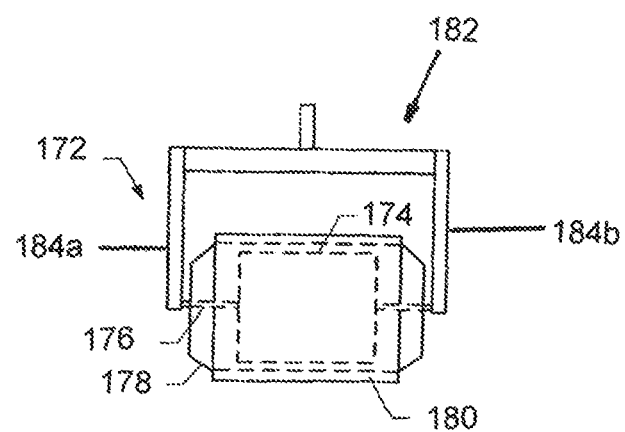
FIG. 12 is a diagram representing a front view of a typical wheel probe.

FIG. 12 is a diagram representing a front view of a typical wheel probe 172 that may be used with any of the apparatuses described above. In particular, the wheel probe 172 can be used in lieu of a stabilizing wheel, such as the first stabilizing wheel 25a. The wheel probe 172 provides for rapid inspection of large areas by creating a two-dimensional scan in the rolling direction of the maintenance cart 18. The wheel probe 172 includes a stator 174 and a rotor 176. The stator 174 is mounted to an axle 176, the opposed ends of which are coupled to respective brackets 184a and 184b of the wheel probe support structure 182. The stator 174 (made, e.g., of stainless steel) forms the housing for the transducer or transducer array (not shown), and also the fixed mounting for the connectors and cables. The rotor 178 (wheel) rotates about the stator 174 on precision bearings (not shown) as the maintenance cart 18 rolls along the trailing edge 112 of a wind turbine blade 108.

The replaceable tire 180, which mounts on and encircles the rotor 178, is made of an acoustic coupling material that acts as a delay line and protects the transducer and allows for good acoustical coupling with the surface of the part under test so that ultrasound waves are passed into the part under test in a controlled manner. One example of such acoustic material is a silicone rubber. In the alternative, other types of acoustic coupling material (e.g., natural rubber) may be used. Processing circuitry n be housed within the stator 174. A rotation encoder (not shown) is mounted on the axle 176 to keep track of the rotational position of stator 174.

Figure 13:
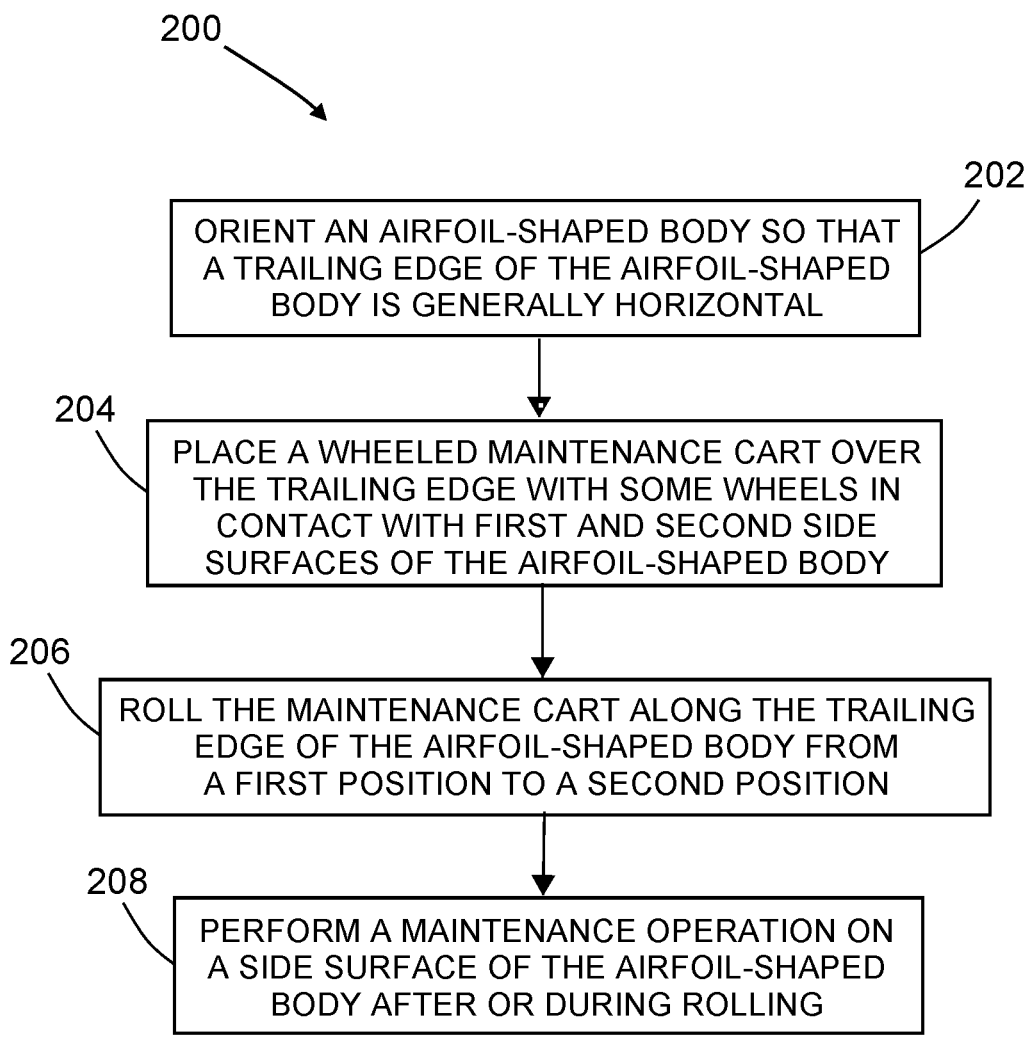
FIG. 13 is a flowchart identifying steps of a method for performing a maintenance operation on an airfoil-shaped body in accordance with one embodiment.

FIG. 13 is a flowchart identifying steps of a method 200 for performing a maintenance operation on an airfoil-shaped body (e.g., wind turbine blade 108) using any one of the apparatuses described above. The method 200 includes the following steps. The wind turbine blade 108 is oriented so that the trailing edge 112 is generally horizontal (step 202). Then a maintenance cart 18 is placed over the trailing edge 112 with at least some vertical wheels 26 in contact with the side surfaces 114, 116 of the wind turbine blade 108 (step 204). Thereafter the maintenance cart 18 is rolled along the trailing edge 112 from a first position to a second position (step 206). A maintenance operation is performed on a surface of the wind turbine blade 108 after or during the rolling (step 208).

The maintenance cart 18 is placed so that at least some vertical wheels 26 are in contact with and roll on the trailing edge 112. In accordance with some embodiments, the vertical wheels 26 in contact with the trailing edge 112 are spring-loaded, and the method 200 further includes adjusting a vertical position of each vertical wheel 26 in contact with the trailing edge 112 as a vertical position of the contacted portion of the trailing edge 112 changes due to physical anomalies and/or irregularities 120. The maintenance operation is one of the following different types: non-destructive inspection, drilling, grinding, deburring, reaming, fastening, applique application, scarfing, ply mapping, marking, cleaning and painting.

Figure 14:
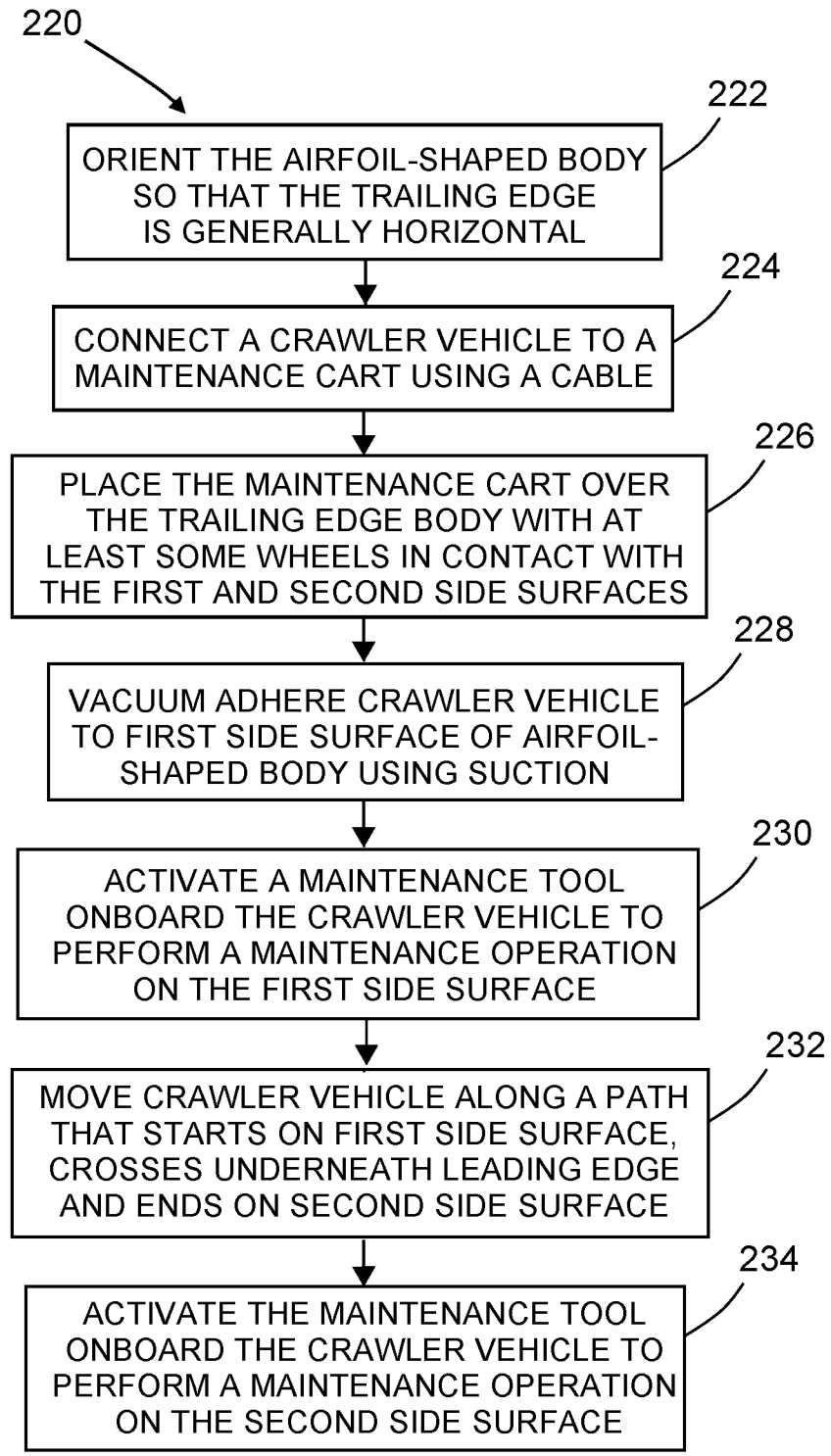
FIG. 14 is a flowchart identifying steps of a method for performing a maintenance operation on an airfoil-shaped body having first and second side surfaces that meet at an angled trailing edge and are connected by a curved leading surface.

FIG. 14 is a flowchart identifying steps of a method 220 for performing a maintenance operation on an airfoil-shaped body (e.g., wind turbine blade 108) having first and second side surfaces (e.g., wind turbine blade side surfaces 114 and 116) that meet at an angled trailing edge (e.g., wind turbine blade trailing edge 112) and are connected by a curved leading surface (e.g., wind turbine blade trailing edge 112) using any one of the apparatuses described above. The method 220 includes the following steps. First, the wind turbine blade 108 is oriented so that the trailing edge 112 is generally horizontal (step 222). Also a crawler vehicle 20 is connected to a maintenance cart 18 using a cable 22 (step 224). Then a maintenance cart 18 is placed over the trailing edge 112 with at least some vertical wheels 26 in contact with the side surfaces 114, 116 of the wind turbine blade 108 (step 226). The crawler vehicle 20 in turn is vacuum adhered to the first side surface 114 using suction (step 228). A maintenance tool 28 onboard the crawler vehicle 20 is activated to perform a maintenance operation on the side surface 114 (step 230). The method 220 depicted in FIG. 14 further includes moving the crawler vehicle 20 along a continuous path that starts on the side surface 114, crosses underneath the curved leading edge 110 and ends on the side surface 116 of the wind turbine blade 108 (step 232). The maintenance tool 28 onboard the crawler vehicle 20 is then activated to perform a maintenance operation on the side surface 116 (step 234).

As seen in FIGS. 2 and 6, the crawler vehicles 20 may be positioned at different elevations. Each crawler vehicle 20 is connected to the maintenance cart 18 by a respective cable 22 which acts as a tether that prevents the crawler vehicle 20 from falling to the ground in the event that the suction devices of the crawler vehicle 20 cease to operate or produce insufficient suction force. The multiplicity of maintenance tools 28 on the swarm of crawler vehicles 20 may be operated to scan respective areas on a surface concurrently in accordance with a preprogrammed mapping of scan paths.

Figure 15:
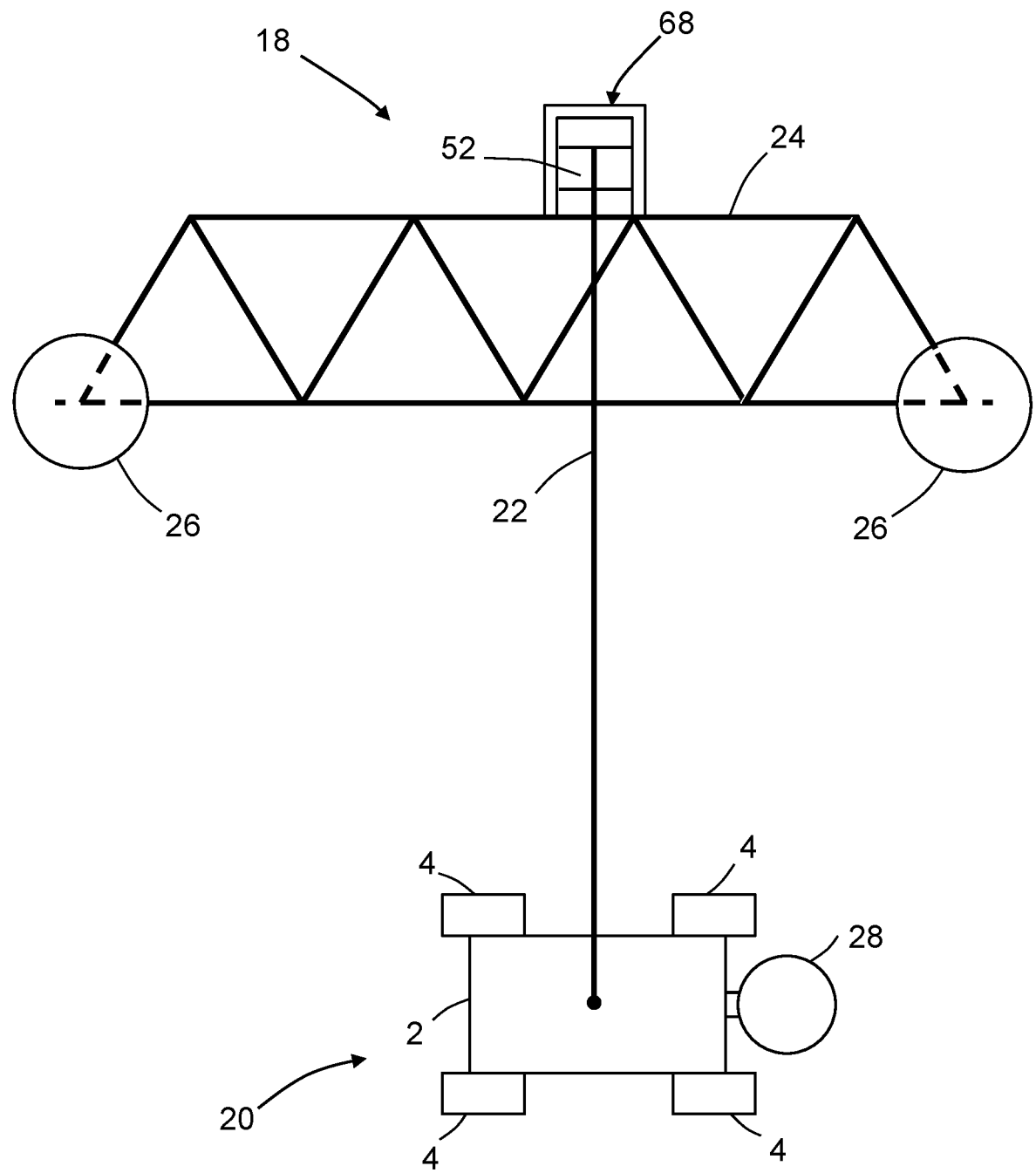
FIG. 15 is a diagram representing a view of a portion of apparatus comprising a spool-equipped maintenance cart and a crawler vehicle connected to the cart by a cable in accordance with one embodiment.

FIG. 15 is a diagram representing a view of a portion of apparatus comprising a spool-equipped maintenance cart 18 and a crawler vehicle 20 connected to a cable spool 52 carried by the maintenance cart 18 by a cable 22 in accordance with one embodiment. The uppermost portion of cable 22 is wound around cable spool 52, which is rotatably coupled to a spool support 68, which in turn is fixedly coupled to the backbone structure 24 of the maintenance cart 18. The distal end of the cable 22 is respectively attached to the frame 2 at an attachment point (indicated by a solid dot in FIG. 15). The cable spool 52 is rotated under computer control to change the amount of cable 22 that is wound on the cable spool 52 as the crawler vehicle 20 moves, e.g., as the crawler vehicle 20 crosses underneath the leading edge 110 of the wind turbine blade, as depicted in FIGS. 2 and 6.

For the sake of simplicity, FIG. 15 shows only a single cable spool 52 that may be carried by any of the maintenance carts 18a-18d described above. In accordance with one proposed implementation, the number of cable spools 52 carried by the maintenance cart 18 will equal the number of crawler vehicles 20 connected to the maintenance cart 18 if each crawler vehicle 20 is connected by a respective single cable 22. In accordance with an alternative proposed implementation, each crawler vehicle 20 may be connected by a respective pair of cables, in which case the number of cable spools 52 carried by the maintenance cart 18 would be two times the number of connected crawler vehicles 20.

Figure 16:
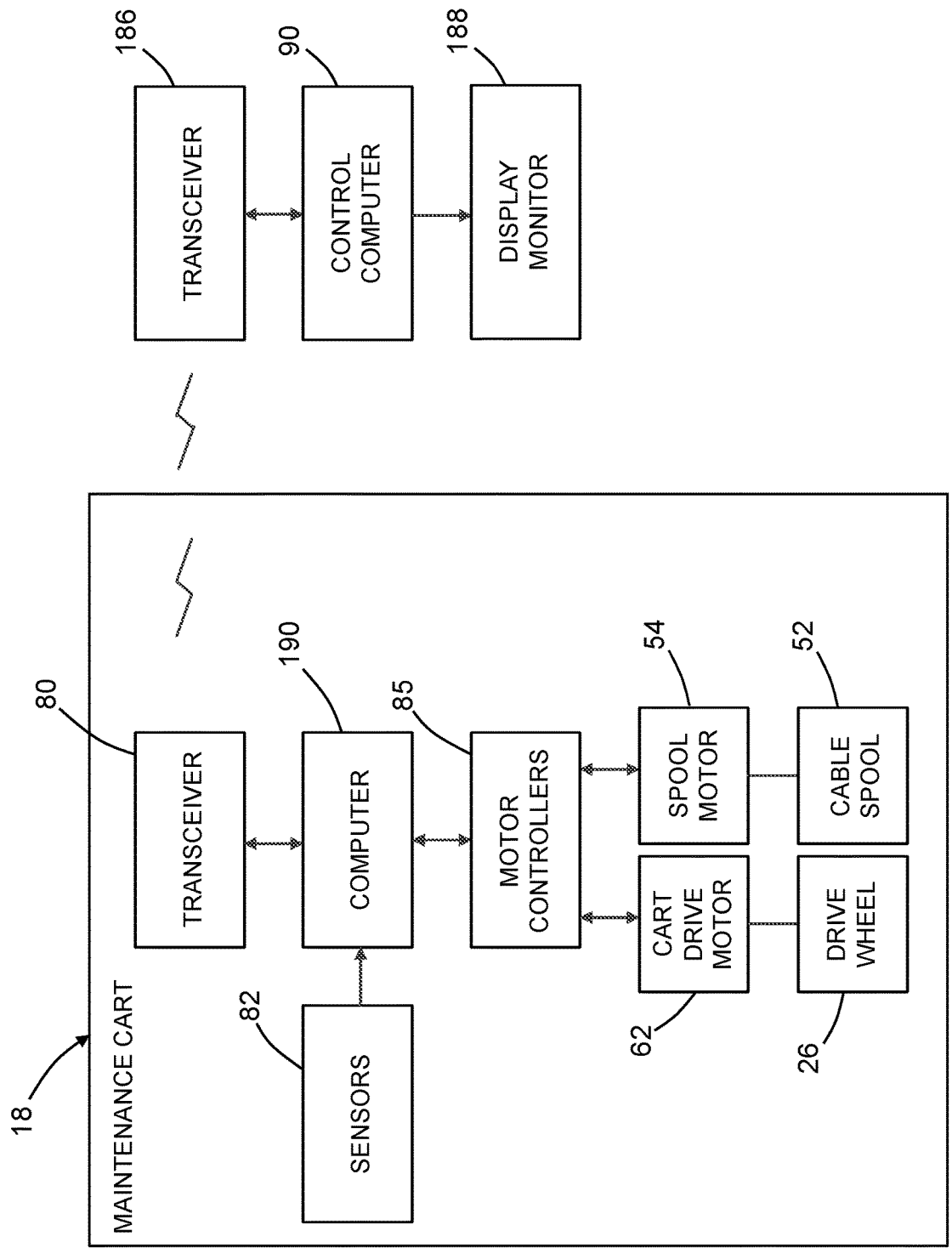
FIG. 16 is a block diagram identifying some components of a computer-controlled system for performing a maintenance operation on a wind turbine blade in accordance with some embodiments.

FIG. 16 is a block diagram identifying some components of a computer-controlled apparatus for performing a maintenance operation on a wind turbine blade 108 using any of the maintenance carts 18a-18d in accordance with any one of the embodiments disclosed herein. In this example, the components of the maintenance cart 18 are controlled by an onboard computer 190, which may be configured with programming stored in a non-transitory tangible computer-readable storage medium (not shown). In particular, the computer 190 may be programmed to execute radiofrequency commands received from a ground-based control computer 90. Those radiofrequency commands are transmitted by a transceiver 186 which is communicatively coupled to the ground-based control computer 90, received by a transceiver 80 onboard the maintenance cart 18, converted into the proper digital format and then forwarded to the onboard computer 190.

The control computer 90 may comprise a general-purpose computer system configured with programming for controlling movement of the maintenance cart 18 along the trailing edge 112. The control computer 90 may also be configured to control activation of the NDI sensor units 126a and 126b (depicted in FIG. 8) in coordination with the controlled movements of the maintenance cart 18. In addition, the control computer 90 is configured with programming for processing data received from the maintenance cart 18 via transceivers 80 and 186 during an inspection operation. In particular, the control computer 90 may comprise a display processor configured with software for controlling a display monitor 188 to display images representing the acquired NDO sensor data.

The computer 190 onboard the maintenance cart 18 communicates with motor controllers 85 that control operation of respective spool motors 54. Each spool motor 54 in turn may be operated to drive rotation of a respective cable spool 52 during winding or unwinding of a respective cable 22. The computer 190 also communicates with a motor controller 85 that controls operation of a cart drive motor 62. The cart drive motor 62 in turn may be operated to drive rotation of a vertical wheel 26. Rotation of the vertical wheel 26 drives displacement of the maintenance cart 18 along the trailing edge 112 of the wind turbine blade 108. More specifically, the cart drive motor 62 may be coupled to the vertical wheel 26 in a manner that allows the maintenance cart 18 to be selectively driven to displace along the trailing edge 112 either away from or toward the hub 106 of the wind turbine 100. In accordance with one proposed implementation, each spool motor 54 and the cart drive motor 62 are stepper motors.

In the embodiment depicted in FIG. 16, the control computer 90 communicates wirelessly with the computer 190 via a wireless system such as a radio frequency (RF) system. Inspection information can then be transmitted wirelessly from the maintenance cart 18 to the control computer 90 in real-time to enable the remote operator to visually observe the inspection of the wind turbine blade 108 in real-time.

FIG. 17A is a diagram representing a top view of a cable-suspended crawler vehicle 20*b* having a turret-mounted cable hook 3 in accordance with one embodiment. FIGS. 17B and 17C are side and end views respectively of the cable-suspended crawler vehicle 20*b* depicted in FIG. 17A. The crawler vehicle 20*b* depicted in FIGS. 17A and 17C is suspended from a cable 22. Preferably the shaft of the cable hook 3 is attached to the frame 2 at a point which is vertically aligned with a center-of-mass of the crawler vehicle 20*b*. The crawler vehicle 20*b* has four wheels 4 with respective axes of rotation that lie in a plane. This plane will be referred to herein as the "crawler vehicle plane". The crawler vehicle 20*b* depicted in FIGS. 17A-17C includes a maintenance tool 28 that is translatable along an axis that may be perpendicular to the crawler vehicle plane. This capability enables the maintenance tool 28 to be lifted over obstacles in the path of the crawler vehicle 20*b*. In accordance with one embodiment, the means for translating the maintenance tool 28 normal to the confronting external surface of the structure undergoing maintenance may take the form of a motorized linear slide 31. In the alternative, there are many different types of actuators that may be used with a linear motion bearing. For example, the maintenance tool 28 may be affixed to a carriage that is driven to slide by a linear actuator (e.g., a motorized lead screw, a motorized rack-and-pinion arrangement, a hydraulic actuator or a pneumatic actuator). In response to detection of an obstacle in the path of the crawler vehicle 20*b*, a controller (not shown in FIGS. 17A-17C) onboard or off-board the crawler vehicle 20*b* activates the linear actuator to cause the maintenance tool 28 to translate to a retracted position whereat contact of the tool with the obstacle may be avoided.

As best seen in FIG. 17A, the end of the cable 22 has a loop by means of which the crawler vehicle 20*b* may be hooked onto the end of the cable 22. The cable hook 3 is fixedly coupled to a turret 46 which is rotatable on a turret base 47 to facilitate alignment of the crawler vehicle 20*b* with a surface. The turret base 47 is fixedly coupled to the frame 2. In the proposed implementation depicted in FIGS. 17A-17C, the turret base 47 is attached to one side of the frame 2 and the turret 46 is rotatable about an axis of rotation which is parallel to the axes of rotation of the wheels 4. In an alternative proposed implementation, the cable 22 may be attached to one end of the frame 2. More specifically, the turret base 47 depicted in FIG. 17A may instead be attached to one end of the frame 2, in which case the turret 46 is rotatable about an axis of rotation which is perpendicular to the axes of rotation of the wheels 4.

Figure 18:
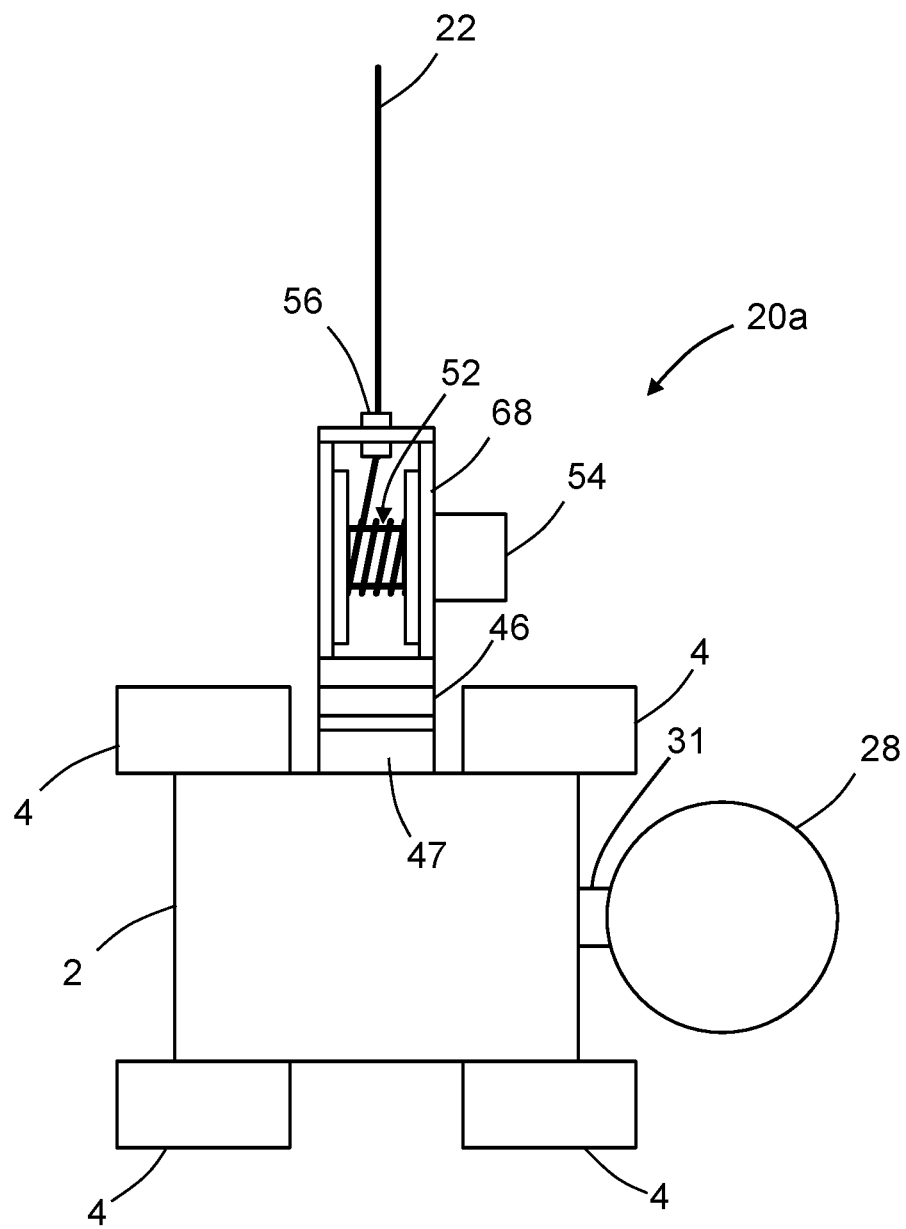
FIG. 18 is a diagram representing a top view of a cable-suspended, vacuum-adhered, spool-equipped crawler vehicle in accordance with one embodiment.

FIG. 18 is a diagram representing a top view of a cable-suspended, vacuum-adhered, spool-equipped crawler vehicle 20*a* in accordance with another embodiment. The crawler vehicle 20*a* depicted in FIG. 18 includes a maintenance tool 28 that may be lifted in the manner previously described with reference to the crawler vehicle 20*b* depicted in FIGS. 17A-17C.

The crawler vehicle 20*a* further includes a cable spool 52 which is rotatably coupled to a spool support 68. The spool support 68 has an opening at the top where the cable 22 passes through a cable holder 56 that is inserted in the opening. During uptake or pay-out (i.e., winding or unwinding) of the cable 22, the cable spool 52 is driven to rotate by a spool motor 54 that is mounted to the spool support 68. The axis of rotation of the cable spool 52 is collinear with a spool axle (not shown in FIG. 16, but see spool axle 50 in FIG. 23) of the cable spool 52.

The spool support 68 in turn is fixedly coupled to a turret 46 which is rotatable on a turret base 47 to facilitate alignment of a crawler vehicle 20 with a surface. The turret base 47 is fixedly coupled to the frame 2 of the crawler vehicle 20*a*. The turret 46 is rotatable about an axis of rotation which is perpendicular to the spool axle 50 of the cable spool 52 and parallel to the crawler vehicle plane. Thus the spool support 68 is rotatable about an axis of rotation of the turret 46.

Each of the crawler vehicles 20*a* and 20*b* further includes a multiplicity of motors (not shown in FIGS. 17A-17C and 18, but see FIG. 26) that receive electrical power via power/signal cords (not shown in the drawings) that extend from a ground-based control station to the crawler vehicles 20*a* and 20*b*. The power/signal cords also provide control signals from a controller (e.g., a computer system) at a ground-based control station which controls the operation of the motors on the crawler vehicles 20*a* and 20*b*. In cases where the maintenance tool 28 on crawler vehicle 20*b* (and optionally on crawler vehicle 20*a*) is an NDI sensor unit, the power/signal cord also provides a pathway for sending NDI sensor data acquired by the NDI sensor unit to ground-based controller.

In accordance with further alternative embodiments, the crawler vehicles 20*a* and 20*b* may communicate wirelessly with a ground-based control station while receiving electrical power from batteries mounted on the crawler vehicles 20*a* and 20*b*. This would avoid the use of a multiplicity of power/signal cords running from the crawler vehicles 20*a* and 20*b* to the ground-based control station. The wireless communications would include: (a) the sending of control signals from a transceiver at the ground-based control station to transceivers on the crawler vehicles 20*a* and 20*b*, which control signals are then forwarded to the motor controllers onboard crawler vehicles 20*a* and 20*b* for controlling movements of the crawler vehicles 20*a* and 20*b*; and (b) the sending of data acquired by the NDI sensor units onboard one or both crawler vehicles 20*a* and 20*b* from the transceivers onboard the crawler vehicles 20*a* and 20*b* to the transceiver at the ground-based control station.

Various embodiments of a crawler vehicle capable of traveling on level and non-level (e.g., inclined or vertical) surfaces will now be disclosed. In accordance with some embodiments of the system proposed herein, holonomic-motion crawler vehicles are employed. Various embodiments of a crawler vehicle capable of moving holonomically on level and non-level surfaces will be disclosed for the purpose of illustration. While some disclosed embodiments carry a non-destructive inspection sensor for inspecting the surface on which the crawler vehicle travels, the holonomic-motion crawler vehicles disclosed herein can alternatively carry other types of tools, such as tools needed in maintenance or painting operations.

Figure 19:
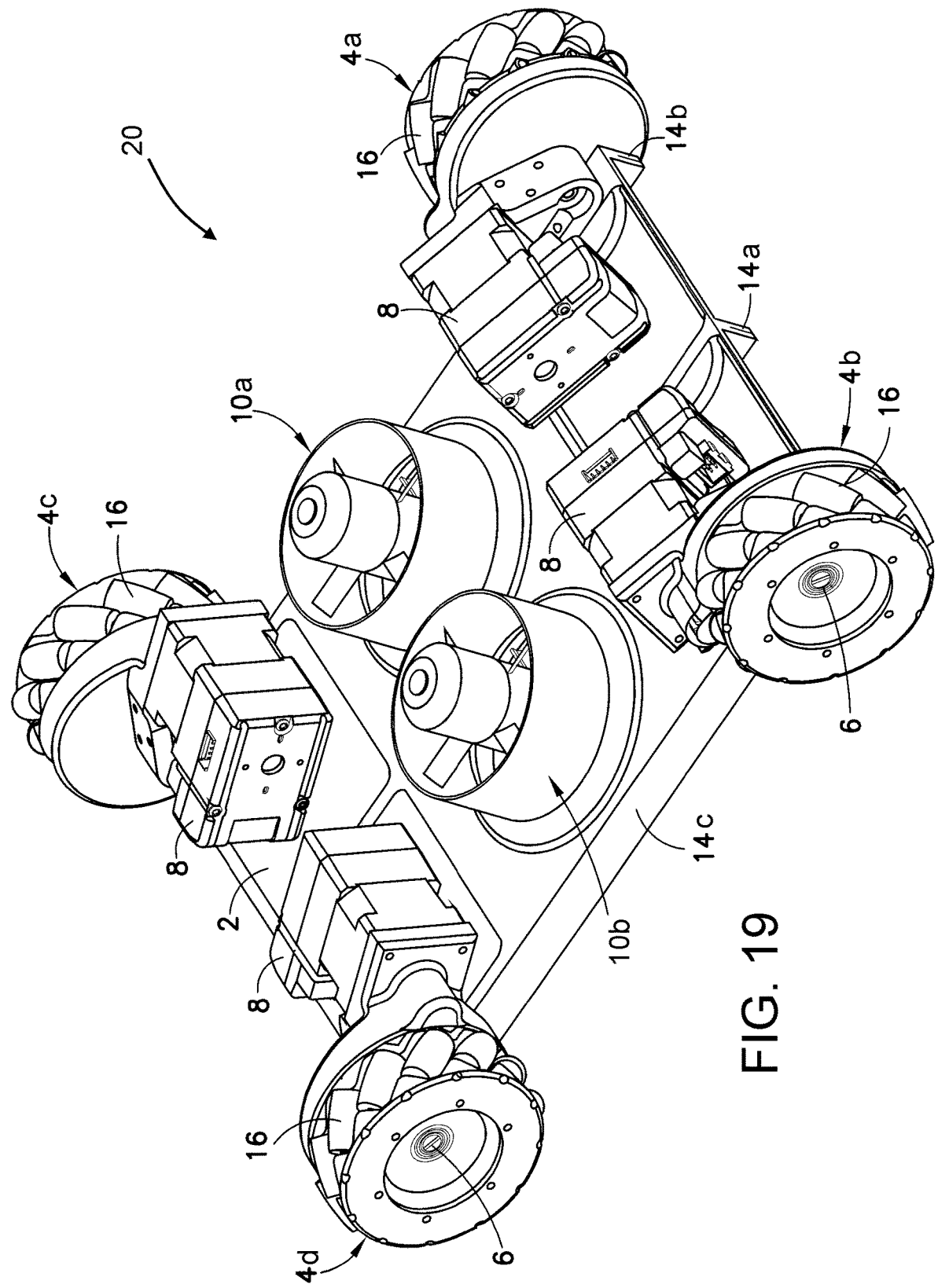
FIG. 19 is a diagram representing a three-dimensional view of parts of a holonomic-motion crawler vehicle having two suction zones in accordance with one embodiment. The electrical connections for supplying signals for controlling operation of the depicted components and other components are not shown.

FIG. 19 shows parts of a holonomic-motion crawler vehicle 20 having four Mecanum wheels and two suction zones in accordance with one embodiment. The electrical connections for supplying signals for controlling operation of the depicted components are not shown. This holonomic-motion platform comprises a frame 2 with four Mecanum wheels 4a-4d (two type "A" and two type "B") mounted to the frame by means of respective wheel axles 6, and further comprises four independently controlled drive motors 8 (one per wheel). Each drive motor 8 controls the rotation of a respective wheel 4a-4d.

A Mecanum-wheeled vehicle is a holonomic system, meaning that it can move in any direction while simultaneously rotating. This is possible because of the shape of the wheels. The standard configuration for a Mecanum-wheeled vehicle has four Mecanum wheels (two type "A" and two type "B"). The Mecanum wheels are arranged with the "A" pair on one diagonal (e.g., wheels 4a and 4d) and the "B" pair on the other (e.g., wheels 4b and 4c), with each having its axle perpendicular to a line running through the center of the vehicle. The axes of the rollers on the type "A" Mecanum wheels are at right angles to the axes of the rollers on the type "B" Mecanum wheels. However, the platform may have any multiple of four Mecanum wheel, e.g., 4, 8, 12, etc.

The holonomic-motion crawler vehicle 20 shown in FIG. 19 utilizes four Mecanum wheels 4a-4d. Each Mecanum wheel 4a-4d has a multiplicity of tapered rollers 16 rotatably mounted to its circumference, each tapered roller 16 being freely rotatable about its axis. These tapered rollers 16 have an axis of rotation which lies at a 45° angle with respect to the plane of the wheel. Type "A" Mecanum wheels have left-handed rollers, while Type "B" Mecanum wheels have right-handed rollers. The holonomic-motion crawler vehicle 20 can be made to move in any direction and turn by varying the speed and direction of rotation of each Mecanum wheel 4a-4d. For example, rotating all four Mecanum wheels 4a-4d in the same direction at the same rate causes forward or backward movement; rotating the wheels on one side at the same rate but in the opposite direction of the rotation by the wheels on the other side causes the vehicle to rotate; and rotating the Type "A" wheels at the same rate but in the opposite direction of the rotation of the Type "B" wheels causes sideways movement.

Figure 26:
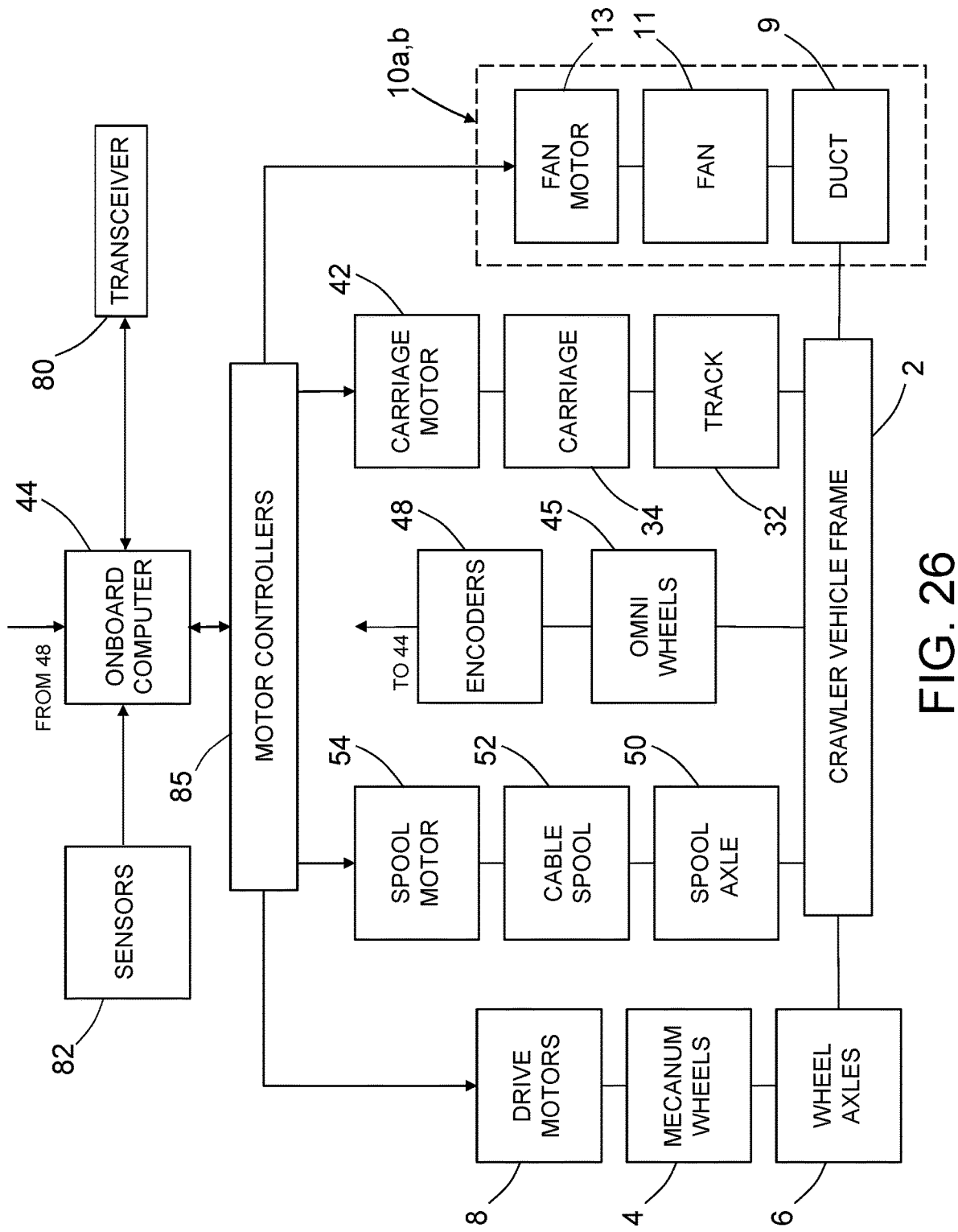
FIG. 26 is a block diagram identifying some components of a holonomic-motion crawler vehicle having both a cable spool and a carriage for a maintenance tool in accordance with another embodiment.

The embodiment depicted in FIG. 19 also has two suction devices arranged side by side in the middle of the frame 2, midway between the front and rear wheels. In this particular embodiment, the suction devices are respective electric ducted fans 10a and 10b which are mounted in a respective opening (not shown in FIG. 19) formed in the frame 2. As indicated in FIG. 26, each electric ducted fan 10a and 10b includes a fan 11 which is rotatable about an axis, a duct 9 surrounding the fan 11, and an electric fan motor 13 which drives the fan 11 to rotate in a direction such that air is propelled from underneath the frame 2 up through the fan duct 9, thereby creating suction in the respective suction zones 12a and 12b (visible in FIG. 20).

Figure 20:
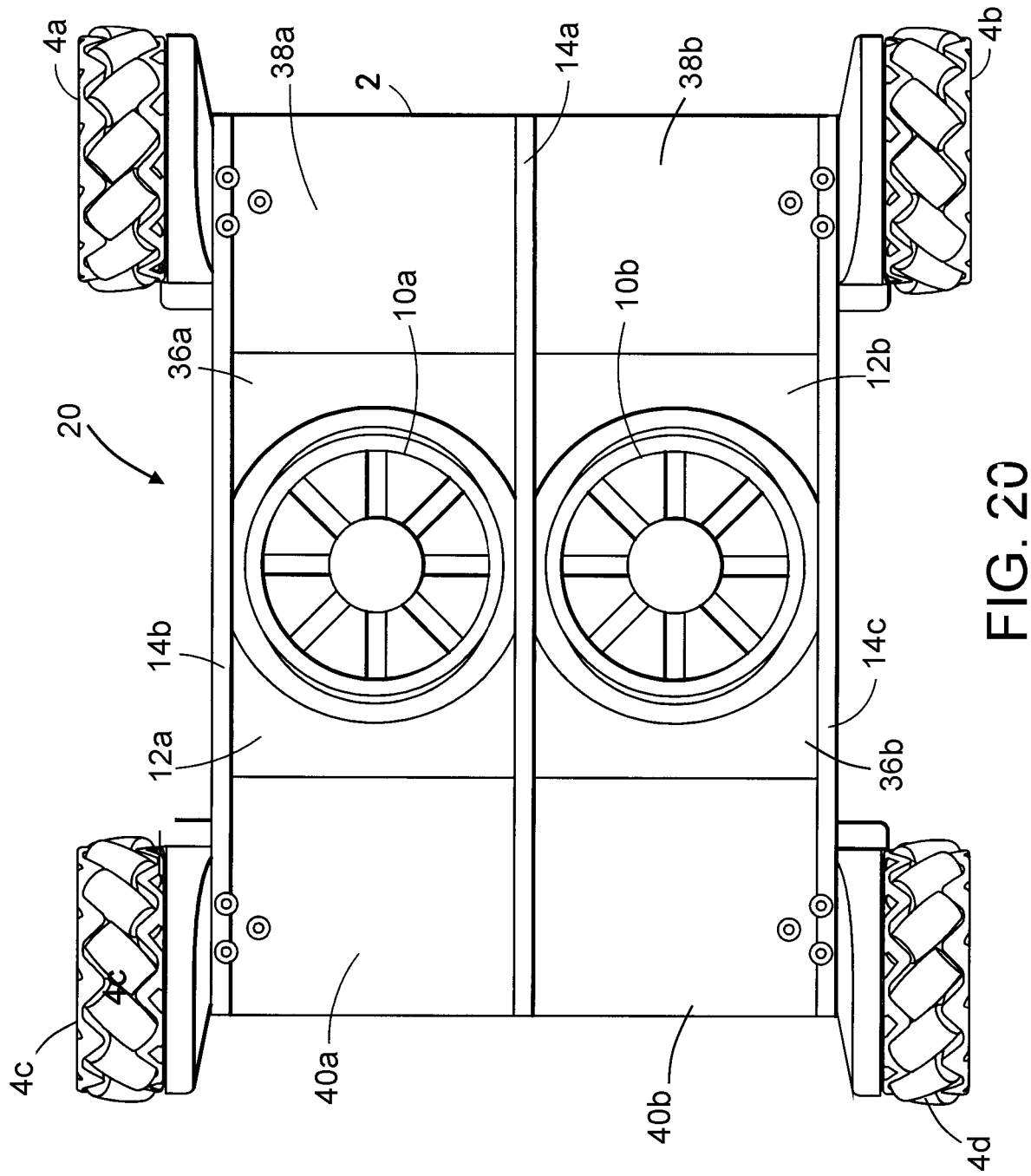
FIG. 20 is a diagram showing a bottom view of a Mecanum-wheeled crawler vehicle having dual suction zones.

FIG. 20 shows a bottom view of a Mecanum-wheeled crawler vehicle 20 having dual suction zones 12a and 12b separated by a middle skirt 14a which bisects the bottom surface of the frame 2 along a longitudinal axis. As best seen in FIG. 20, the two suction zones 12a and 12b are bounded on opposing sides by longitudinal low-surface-friction flexible skirts 14b and 14c which are attached to the frame 2, the middle skirt 14a forming a common boundary wall separating the two suction zones 12a and 12b. The skirts 14a-14c may extend downward so that their bottom edges contact the surface on which the vehicle is moving.

In this particular construction, the area of the bottom surface between skirts 14a and 14b comprises a flat central surface 36a having an opening of one electric ducted fan 10. This flat central surface 36a is flanked by forward and rearward convex surfaces 38a and 40a. Similarly, the area of the bottom surface between skirts 14a and 14c comprises a flat central surface 36b having an opening of one electric ducted fan 10. This flat central surface 36b is flanked by forward and rearward convex surfaces 38b and 40b. Each of the convex surfaces 38a, 38b, 40a and 40b may be an aerodynamically streamlined surface which forms a respective throat with opposing portions of the surface on which the vehicle is moving. Thus, the contoured bottom surface of the frame 2, the skirts 14a-14c and the inclined surface 111 on which the crawler vehicle 20 is moving define respective channels that allow sufficient air to be sucked up through the corresponding electric ducted fan 10a or 10b to generate a desired suction force. The portion of each channel between the lowest points of the convex surfaces 38a, 38b, 40a and 40b forms respective suction zones 12a and 12b. In the particular embodiment depicted in FIG. 20, the suction zones 12a and 12b are separated by the middle skirt 14a and are in fluid communication with the respective openings in which the electric ducted fans 10a and 10b are installed. These openings may be substantially conical along a lowermost portion thereof to facilitate the flow of air out the suction zone.

It should be appreciated that the under-body surface shape seen in FIG. 20 is an exemplary implementation. The under-body surface may have many different shapes conducive to the flow of air from the front and rear of the crawler vehicle 20 through the space underneath the crawler vehicle 20 and then up through the ducts 9 of the electric ducted fans 10a and 10b.

Although not shown in FIG. 19, the holonomic-motion crawler vehicle 20 is tethered to the maintenance cart 18 by a cable 22 (see, e.g., FIG. 2) which also supplies electrical power to the drive motors 8 and electric ducted fans 10a and 10b on the vehicle. The cable 22 also provides control signals to an onboard computer 44 (see FIG. 26) which controls the operation of the drive motors 8 and electric ducted fans 10. The onboard computer 44 communicates with respective motor controllers 85 (see FIG. 26) which control the operation of the drive motors 8 and electric ducted fans 10. In accordance with one embodiment, the drive motors 8 are stepper motors. For example, each motor controller 85 may include an indexer (e.g., a microprocessor) configured to generate step pulses and direction signal for a driver which is also part of the motor controller. The driver converts the indexed command signals into the power necessary to energize the motor windings. A stepper motor is an electromagnetic device that converts digital pulses into mechanical shaft rotation. The onboard computer 44 may further include a computer or processor for commanding and orchestrating the motor controllers 85. The holonomic-motion crawler vehicle 20 may further include a converter box (not shown) mounted to the frame 2. The converter box converts USB signals from the onboard computer 44 into pulse-width-modulated (PWM) signals for controlling the fan motors 13 (see FIG. 26).

In accordance with an alternative embodiment, the crawler vehicle 20 could be battery-powered, instead of receiving electrical power via a power/signal cord. Also the motor controllers (not shown in FIG. 19, but see motor controllers 85 in FIG. 26) could be under the control of an onboard computer (not shown in FIG. 19, but see onboard computer 44 in FIG. 26) rather than a ground-based computer. Alternatively, the motors onboard the crawler vehicle 20 can be controlled via a wireless connection to an off-board controller.

Referring again to FIG. 20, the frame 2 of the crawler vehicle 20 requires some amount of compliance to keep all of the Mecanum wheels 4a-4d in contact with a surface without slipping. If only three of the four Mecanum wheels 4 are in contact with the surface and can generate traction, the crawler vehicle 20 will not respond properly to motion inputs. One way to address the wheel contact issue is to build a frame with low torsional stiffness. Another way is to provide suspension for one or more of the Mecanum wheels 4a-4d.

As depicted in FIG. 20, the underside of the frame 2 is shaped to provide two suction zones 12a and 12b. Also the frame 2 has low-surface-friction skirts 14a-14c that conform to non-flat surfaces. The electric ducted fans 10a and 10b are installed in respective openings in the frame 2 and are in fluid communication with respective suction zones 12a and 12b defined by the frame bottom surface and the skirts 14a-14c. When the electric ducted fans 10a and 10b are turned on, each electric ducted fan propels air upward, thereby sucking air from the shaped suction zones 12a and 12b respectively. The electric ducted fans 10a and 10b can be independently controlled to apply different suction forces to the confronting surface underneath the respective suction zones 12a and 12b.

Figure 21:
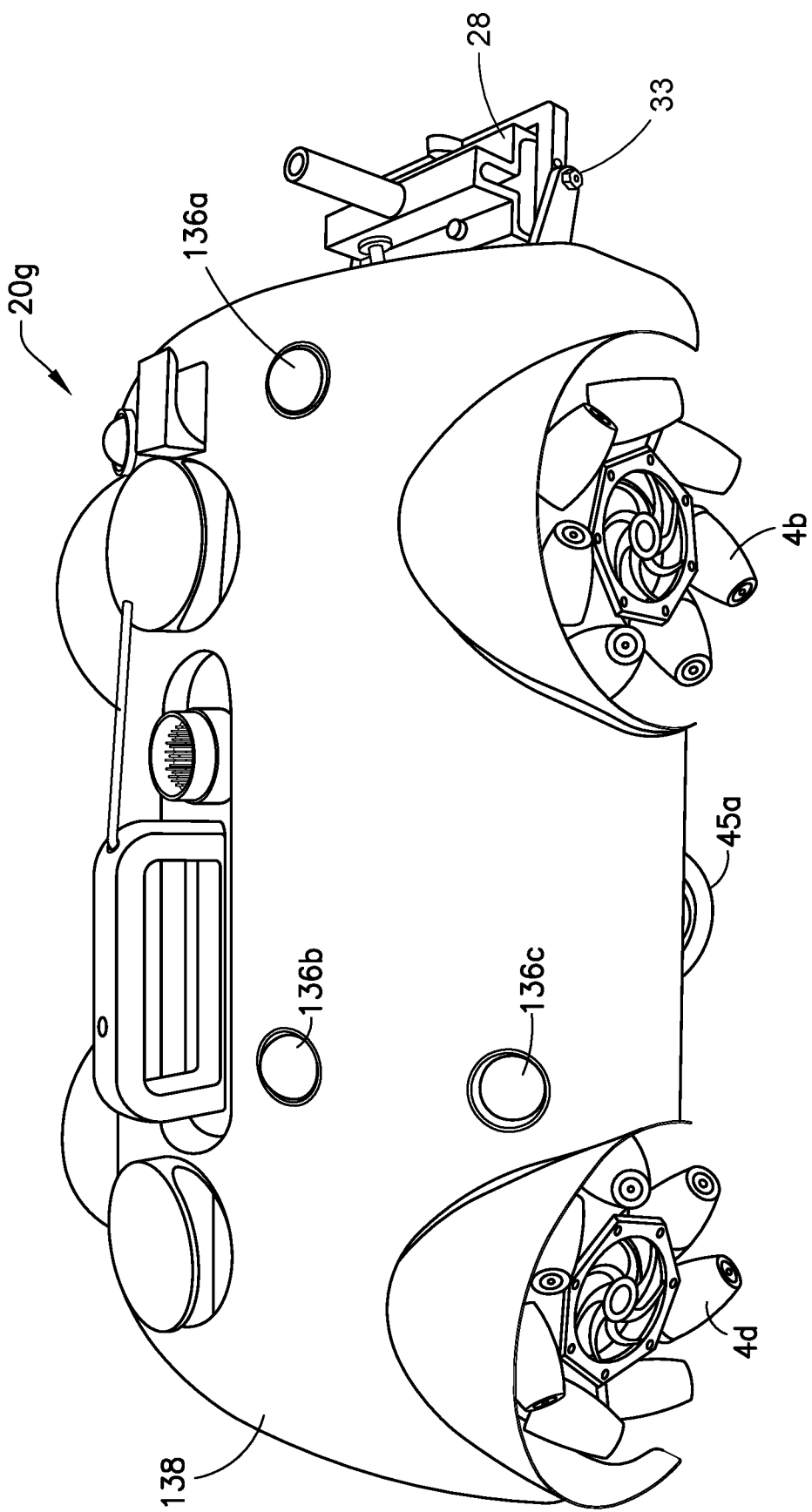
FIG. 21 is a diagram representing a view of a holonomic-motion crawler vehicle that has front and back sets of four vacuum adherence devices in accordance with one embodiment.

FIG. 21 is a diagram representing a view of a holonomic-motion crawler vehicle 20c that uses vacuum adhesion technology and holonomic wheels to adhere and be mobile on non-magnetic surfaces. Crawler vehicle 20c may be equipped with a maintenance tool 28 (such an NDI sensor unit) mounted to a gimbal 33 having two rotational degrees of freedom. The crawler vehicle 20c adheres to non-magnetic surfaces through a dual vacuum assist system along with eight vacuum adherence devices 150 (seen in FIG. 22) that each form a vacuum seal. These vacuum adherence devices 150 are dragged along the surface when the crawler vehicle 20c is in motion. This adhesion mechanism has no issue navigating or adhering to flat surfaces and can maintain attachment to the surface at all angles.

FIG. 21 shows a holonomic motion crawler vehicle 20c that has four Mecanum wheels 4a-4d (only wheels 4b and 4d are visible in FIG. 21), four omnidirectional wheels (hereinafter "omni wheels"; only omni wheel 45a is visible in FIG. 21) and respective sets of three LED lights 136a-136c on each side (only one set is visible in FIG. 21). In accordance with the embodiment depicted in FIG. 21, the LED lights 136a-136c are arranged in an asymmetric pattern on the cover of the crawler vehicle. Each LED light has a generally hemispherical bulb that projects above the cover 138 of the crawler vehicle 20c.

Figure 22:
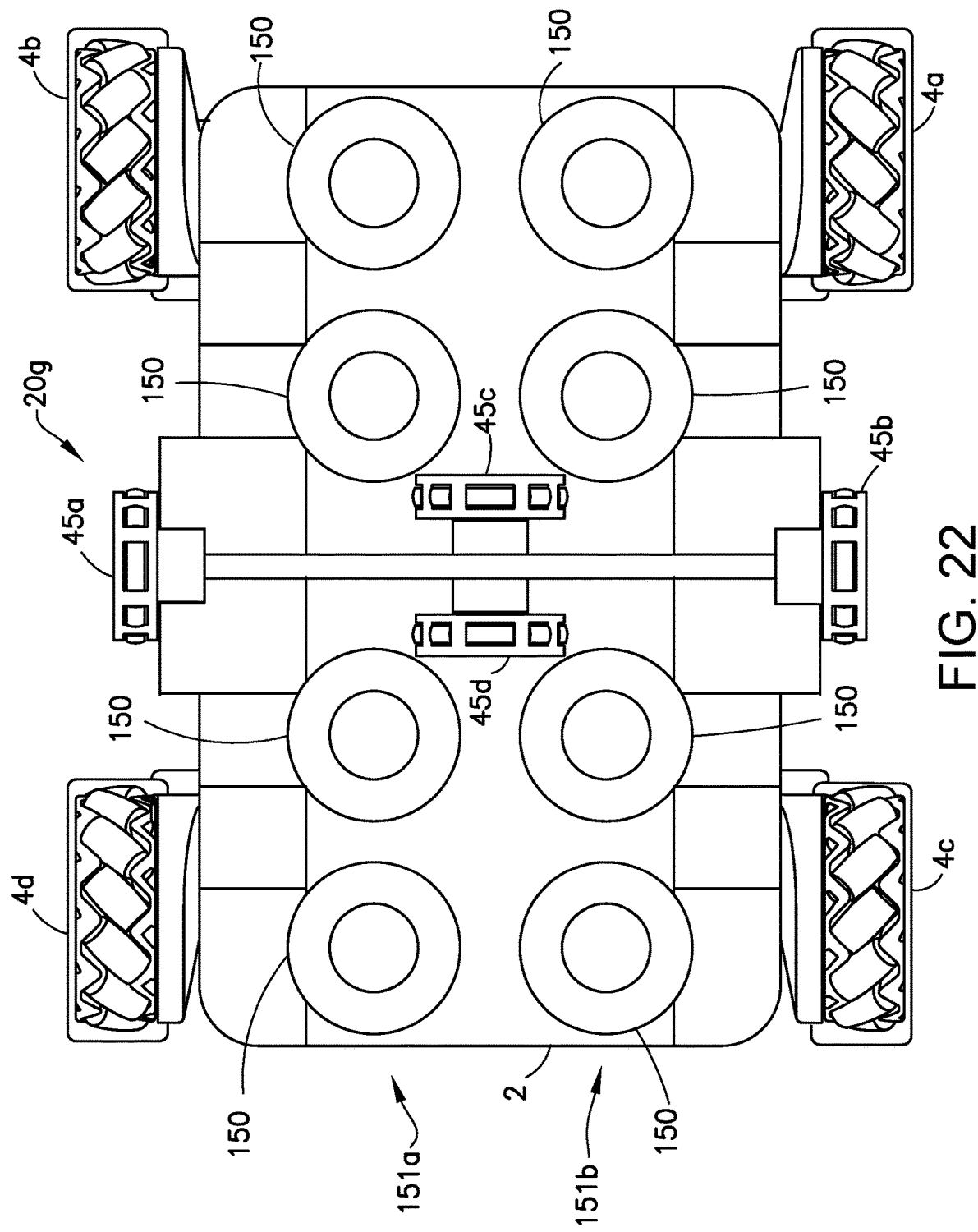
FIG. 22 is a diagram representing a bottom view of the holonomic-motion crawler vehicle depicted in FIG. 21.

FIG. 22 is a diagram representing a bottom view of the holonomic-motion crawler vehicle depicted in FIG. 21. The holonomic-motion crawler vehicle 20c further includes a multiplicity of vacuum adherence devices 150. For example, the multiplicity of vacuum adherence devices 150 may include a first set 151a of four vacuum adherence devices 150 arranged in a first row and a second set 151b of four vacuum adherence devices 150 arranged in a second row which is parallel to the first row. Other configurations for placement of the vacuum adherence devices 150 are possible. The vacuum adherence devices 150 are configured to provide enhanced adherence of the crawler vehicle 20c to the convex curved contours of an external surface 111 (see FIG. 23B).

A location tracking system can be provided which is capable of measuring the location of crawler vehicle 20c in absolute coordinates following the completion of a motion that was tracked incrementally, e.g., using rotation encoders 48 (see FIG. 26) operatively coupled to a set of four omni wheels 45a-45d. One example of an incremental motion measurement system is a dead-reckoning odometry-based system. Any dead-reckoning solution will have measurement inaccuracies due to small errors that build up over time. These can be caused by systematic errors in the device or disruptions caused by unexpected changes in the environment.

This device depicted in FIG. 22 has a four-omni wheel, perpendicular, double-differential configuration. Respective rotation encoders 48 (not shown in FIG. 22, but see rotation encoders 48 in FIG. 26) measure rotation of the omni wheels 45a-45d. As the omni wheels 45a-45d roll on a surface, the rotation encoders 48 produce encoder pulses representing respective encoder counts which are sent by the onboard computer 44 to an operations control center via a power/signal cable (not shown in FIGS. 21 and 22) after each incremental rotation of each omni wheel. Each rotation encoder 48 will output an encoder count proportional to the angle of rotation of a respective omni wheel. These encoder pulses will be received by a ground-based computer system that computes the X and Y coordinates of the device.

The ground-based control system stops the crawler vehicle 20 when the counts of encoder pulses indicate that the crawler vehicle 20 has arrived at the desired location. The current location of the stopped crawler vehicle can then be checked to determine to what extent it may deviate from the desired location. Corrections can be made to the relative motion measurements by acquiring accurate, absolute measurements at lower update rates. This absolute measurement process (performed while the crawler vehicle 20 is stopped) can be integrated into a relative motion measurement system running at higher update rates, which acquires relative motion measurements while the crawler vehicle 20 is moving. In accordance with one embodiment, a lower-update-rate local positioning system-based process provides corrections to a higher-update-rate odometry system.

A process for absolute measurement of the position of the crawler vehicle 20c is implemented by acquiring an image with the LED lights 136a-136c off and then turning the lights on and acquiring another image (or vice versa). Two variations of the process have been developed: one in which all the lights are turned on at the same time, and another in which the lights are turned on in a specific sequence. The first way is slightly faster. It employs a light pattern on the surface of the target object that is asymmetric. The second method is more robust in differentiating between the lights and does not require the light pattern to be asymmetric. The absolute measurement system (not shown in the drawings) includes a laser range meter mounted to a pan-tilt unit that produces position and orientation data at finite time intervals.

Figure 23A:
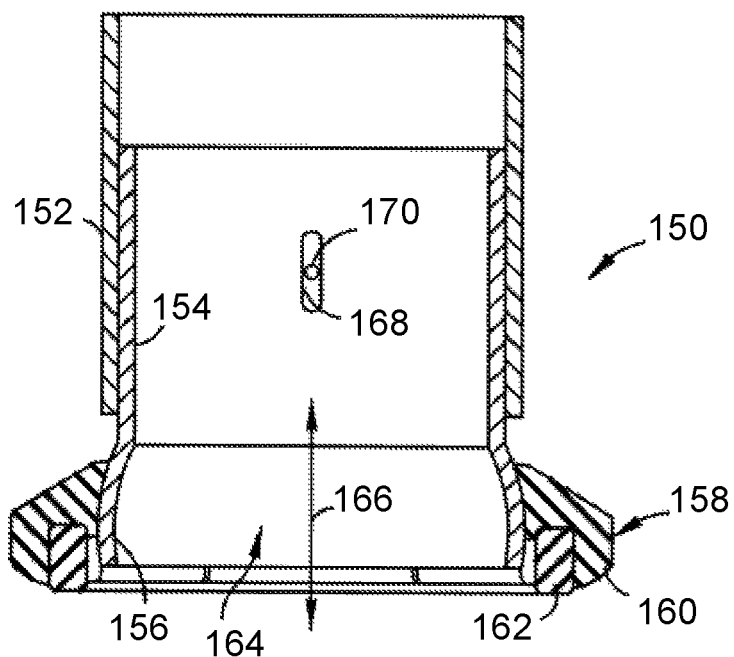
FIG. 23A is a diagram representing a cross-sectional view of a vacuum adherence device in accordance with one implementation.

FIG. 23A is a diagram showing a cross-sectional view of a vacuum adherence device 150 in accordance with one implementation. This vacuum adherence device 150 comprises a circular cylindrical sleeve housing 152 and a sleeve 154 having a circular cylindrical portion which is axially slidable along a center axis 166 inside the sleeve housing 152. The sleeve 154 further comprises bearing portion 156 having an outer spherical bearing surface having a center point located along the center axis 166. The bearing portion 156 may be integrally formed with the aforementioned circular cylindrical portion of sleeve 154. The vacuum adherence device 150 further comprises a pivotable seal assembly 158 comprising a socket ring 160 that holds a seal 162. The socket ring 160 also has an inner spherical bearing surface which is concentric with and pivotably coupled to the outer spherical bearing surface of bearing portion 156 of sleeve 154. The pivot point of the socket ring 160 is collocated with the center point of the outer spherical bearing surface of bearing portion 156 of sleeve 154.

The pivotable seal assembly 158 is configured to rotate relative to the sleeve 154 about the pivot point to at least partially conform to a shape of a confronting surface. The vacuum adherence device 150 can adhere to such a confronting surface when air is drawn into a channel 164 formed in part by the channel of sleeve housing 152, in part by the channel of sleeve 154, and in part by the opening in the seal 162. The pivotable seal assembly 158 is configured to rotate relative to the sleeve 154 independently of translational movement of the sleeve 154 in a direction parallel to the center axis 166 within the sleeve housing 152. The amount of rotation of pivotable seal assembly 158 may be limited by the size and/or shape of the outer spherical bearing surface of the bearing portion 156 of sleeve 154.

Although not shown in FIG. 23A, the vacuum adherence device 150 preferably comprises a spring arranged to urge the sleeve 154 to extend out of the sleeve housing 152 by downward (as seen in the view of FIG. 23A) sliding along the center axis 166. This sliding movement may be restricted to within a selected range of movement. However, sleeve 154 may "float" freely relative to sleeve housing 152 within this selected range of movement. This restriction of the translational motion of sleeve 154 can be implemented by providing a slot 168 in the wall of the circular cylindrical portion of sleeve 154 and by providing a pin 170 which extends radially inward from the wall of sleeve housing 152 and into the slot 168. The pin 170 may also be used to hold sleeve 154 inside sleeve housing 152. The length of slot 168 restricts the sliding movement of sleeve 154 relative to sleeve housing 152.

The channel 164 is in fluid communication with a control valve (not shown in FIG. 23A), which control valve is in turn in flow communication with a vacuum pump (also not shown in FIG. 23A). The vacuum pump, control valve, channel 164, and connecting conduits form a vacuum system which is configured to draw air into the channel 164 such that a vacuum adherence is formed between the pivotable seal assembly 158 and a confronting surface. The vacuum adherence is the result of a vacuum pressure generated inside the channel 164. When the flow of air is reversed, air provided by the pump flows through any gap between the seal 162 and the confronting external surface 111. The height of the gap may vary along the periphery of the seal 162. This gap height depends on the shape of the confronting surface and the degree of rotation of the seal 162 to conform to that shape. The seal 162 may be formed of any one of a number of different materials. For example, seal 162 may comprise silicone rubber or other elastomeric material, a viscoelastomeric material, or some other suitable flexible material.

Figure 23B:
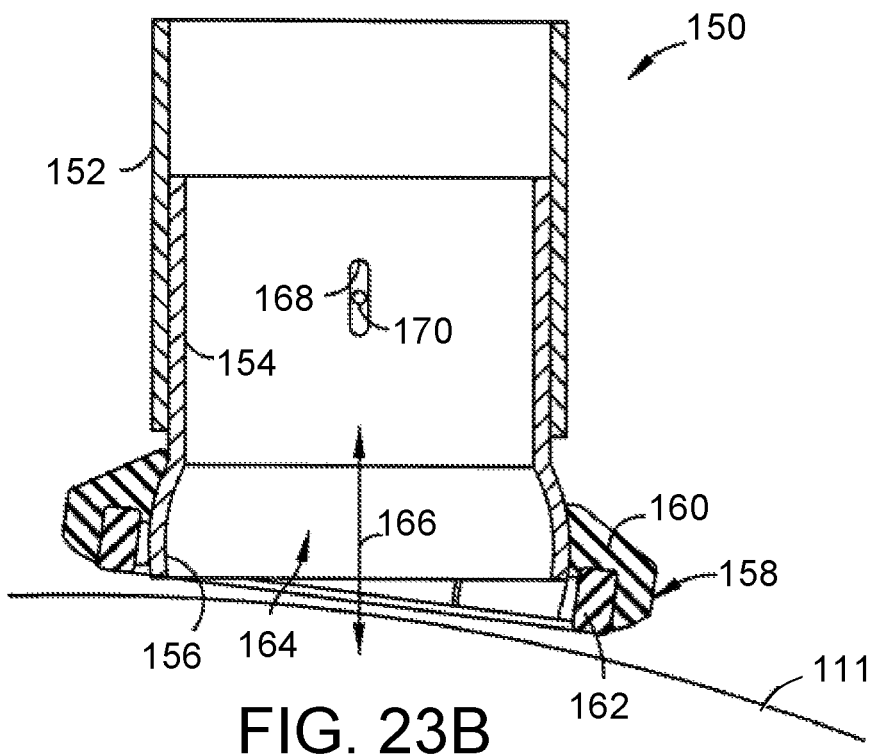
FIG. 23B is a diagram representing a cross-sectional view of the vacuum adherence device depicted in FIG. 23A adhered to a non-planar blade surface. The air gap between the vacuum adherence device and the non-planar surface has been exaggerated for the purpose of illustration.

FIG. 23B shows a cross-sectional view of the vacuum adherence device 150 depicted in FIG. 23A adhered to a convex curved external surface 111. The air gap between the vacuum adherence device 150 and the external surface 111 has been exaggerated for the purpose of illustration. The air gap may function as an air bearing that holds the pivotable seal assembly 158 close to the external surface 111, while reducing static friction to within selected tolerances. In other words, the air gap allows pivotable seal assembly 158 to "float" above the external surface 111 while maintaining vacuum adherence between pivotable seal assembly 158 and external surface 111. Further, the air gap allows pivotable seal assembly 158 to be moved over the external surface 111 with a reduced amount of static friction and without causing undesired effects to the surface.

The crawler vehicles 20 disclosed herein have multiple applications. In accordance with one application, the crawler vehicle 20 carries an NDI sensor unit (such as an ultrasonic transducer or an eddy-current sensor), but other types of maintenance tools may be carried. The sensor may be a single sensing element or an array of sensing elements. Cameras, tools, painting equipment, a laser marking system, a robotic arm manipulator, or other devices could also be carried by the platform.

Figure 24:
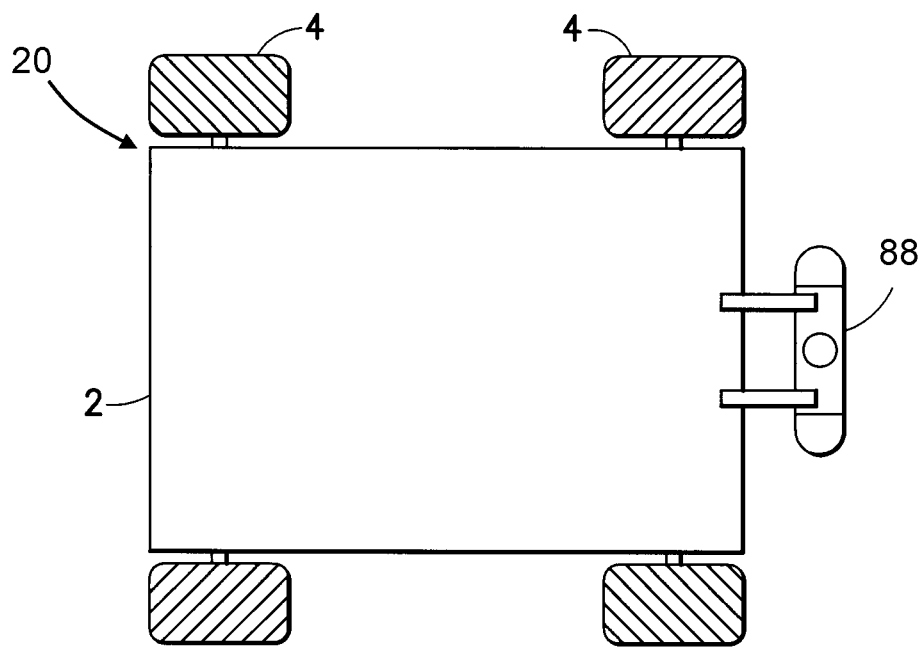
FIG. 24 is a diagram representing a top view of a Mecanum-wheeled frame of a crawler vehicle having a fixed NDI scan head attached to one end thereof.

FIG. 24 shows a version of the crawler vehicle 20 with a fixed ultrasonic transducer array 88 mounted to one end of the frame 2. The ultrasonic transducer array 88 can scan an underlying surface in the direction in which the vehicle crawls. The ultrasonic sensor may be a single ultrasonic sensing element or an array of ultrasonic sensing elements.

Figure 25:
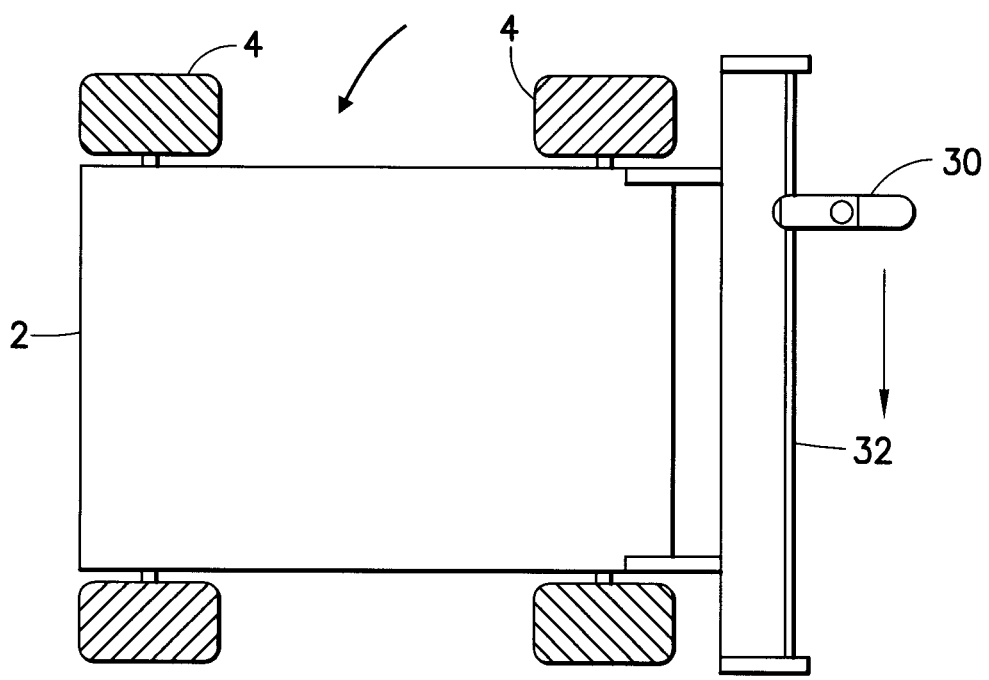
FIG. 25 is a diagram representing a top view of a Mecanum-wheeled frame of a crawler vehicle having a reciprocating NDI scan head mounted to one end thereof.

FIG. 25 shows another version of the crawler vehicle 20 with a scanning ultrasonic sensor unit 30 (e.g., a linear or curved ultrasonic transducer array) mounted on a linear track 32 fixed to one end of the frame. The ultrasonic sensor unit 30 can slide back and forth along the linear track 32, scanning a transverse area of underlying surface while the crawler vehicle 20 is stationary. Again, the ultrasonic sensor may be a single sensing element or an array of sensing elements. The vehicle can be moved forward in increments, pausing after each incremental move to allow the ultrasonic sensor unit 30 to scan along a transverse line. Alternatively, a controller can be programmed to control the movements of the crawler vehicle 20 and the scanning head to provide other patterns for scanning a surface area.

FIG. 26 is a block diagram identifying some components of a holonomic-motion crawler vehicle that is equipped with both a cable spool 52 and a carriage-mounted maintenance tool (only the carriage 34 is shown in FIG. 26) in accordance with one embodiment. This spool- and tool-equipped holonomic-motion crawler vehicle includes a frame 2 having a set of four wheel axles 6 fixedly coupled thereto. A set of four Mecanum wheels 4 are rotatably coupled to respective wheel axles 6. A set of four drive motors 8 are configured to respectively drive rotation of the Mecanum wheels 4 in response to control signals received from respective motor controllers 85. The motor controllers 85 in turn receive commands from an onboard computer 44. The onboard computer 44 is programmed to receive operational instructions from a ground-based control computer via a transceiver 80 and then issue commands in the formats recognized by the motor controllers 85. In addition, a pair of electric ducted fans 10*a* and 10*b* are incorporated in the frame 2. (In alternative embodiments, the number of electric ducted fans may be different than two.) Each electric ducted fan 10*a* and 10*b* includes a fan 11 which is rotatable about an axis, a duct 9 surrounding the fan, and an electric fan motor 13 which drives the fan 11 to rotate in response to control signals received from the onboard computer 44.

The holonomic-motion crawler vehicle partly represented in FIG. 26 further includes a spool axle 50 fixedly coupled to the frame 2, a cable spool 52 rotatably coupled to the spool axle 50, and a spool motor 54 configured to drive rotation of the cable spool 52 in response to control signals received from the onboard computer 44. In addition, the holonomic-motion crawler vehicle partly represented in FIG. 26 includes a linear track 32 mounted to the frame 2. More specifically, the linear track 32 may be translatably coupled to a motorized linear slide 31 of the type depicted in FIG. 17B. A carriage 34, to which the maintenance tool 28 (not shown in FIG. 26) is fixedly coupled, is translatably coupled to the linear track 32 and driven to translate laterally along the linear track 32 by a carriage motor 42 (by way of a gear train not shown) in response to control signals received from the onboard computer 44.

In addition, the onboard computer 44 may be programmed to track the location of the crawler vehicle using differential odometry. (In this context, the term "location" includes position in a three-dimensional coordinate system and orientation relative to that coordinate system.) For this purpose, the crawler vehicle components depicted in FIG. 26 include a set of omni-directional wheels 45 with respective rotation encoders 48. The encoded data output by the rotation encoders 48 is received by the onboard computer 44. In accordance with the teachings herein, a frame 2 of a crawler vehicle may have a set of four omni-directional wheels 45 for tracking vehicle motion and a set of four Mecanum wheels 4 for driving the vehicle under the control of the onboard computer 44. More details regarding such a subsystem for differential odometry can be found in U.S. Pat. No. 9,470,658.

All of the motors identified in FIG. 26 are mounted to the frame 2. The onboard computer 44 is configured to control operation of the motors so that each holonomic-motion crawler vehicle 20 (see FIG. 2) performs a maintenance operation in a respective area of the surface of the wind turbine blade 108. The onboard computer 44 receives data from sensor(s) 82. The sensor(s) 82 may, e.g., include an inclinometer that provides data representing the angle of inclination of the holonomic-motion crawler vehicle 20 or respective sensors that provide data representing the loads on each wheel. The onboard computer 44 processes that information to: (1) control the drive motors 8 as a function of the position/orientation data and (2) control the electric ducted fans 10a and 10b as a function of the sensor data as disclosed in U.S. Pat. No. 8,738,226.

Figure 27:
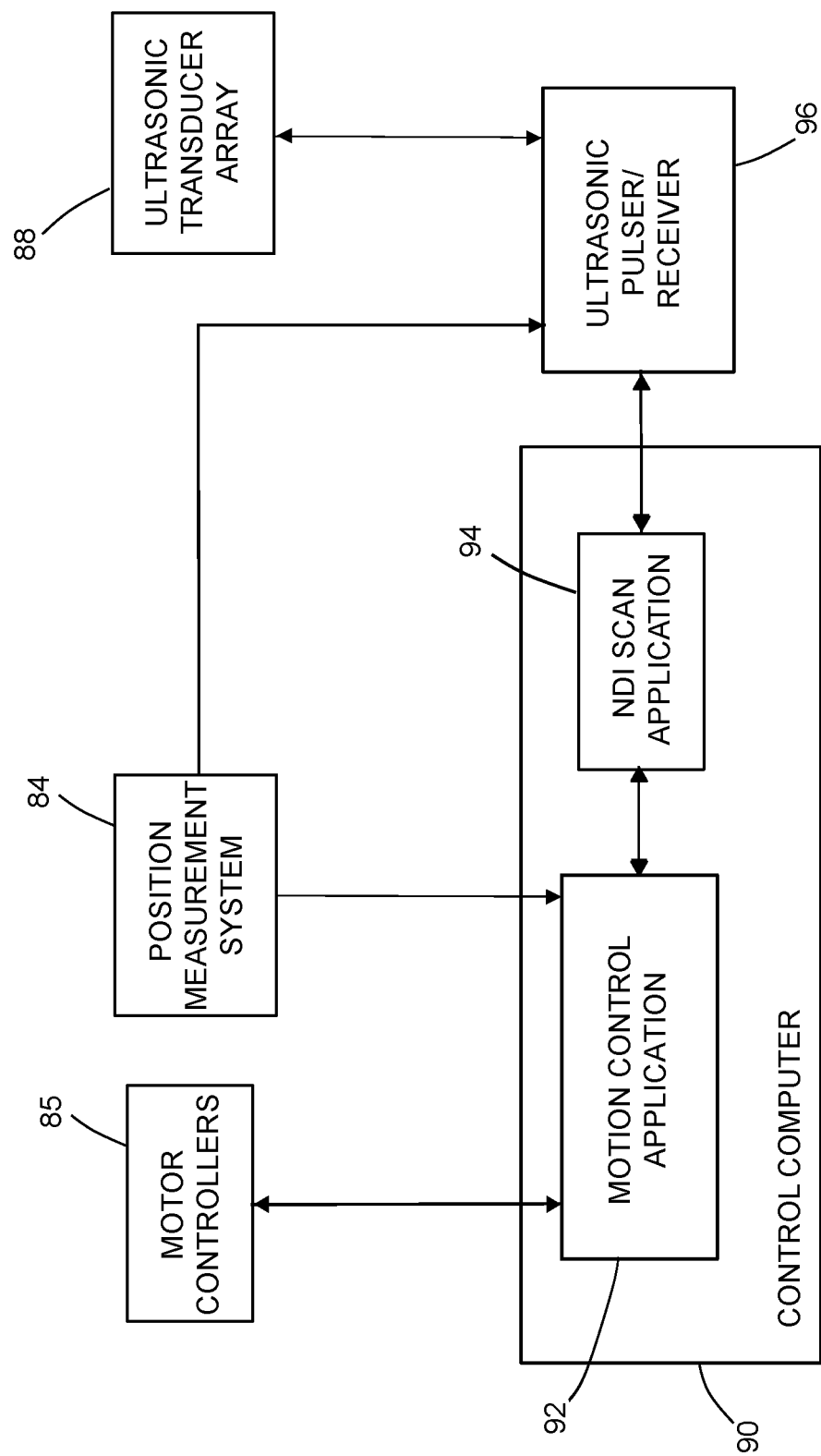
FIG. 27 is a block diagram identifying some components of a system for performing an ultrasonic inspection on a surface of a body in accordance with one proposed computer architecture.

FIG. 27 is a block diagram identifying some components of a system for performing an ultrasonic inspection on a surface of an airfoil-shaped body in accordance with one proposed computer architecture. In this example, the NDI sensor unit is an ultrasonic transducer array 88. As previously disclosed above, the system may include a control subsystem that uses rotation encoders to track the relative location (e.g., relative to an initial location acquired using a local positioning system) of the ultrasonic transducer array 88. More specifically, the control system includes a ground-based control computer 90 programmed with motion control application software 92 and NDI scan application software 94. The control computer 90 may be a general-purpose computer programmed with motion control application software 92 including respective software modules for sending instructions to the computers 44 onboard the crawler vehicles 20. Those onboard computers 44 in turn output commands to the motor controllers 85 onboard the crawler vehicles 20, including at least four motor controllers on each crawler vehicle that control operation of the motors for coordinating movements of the crawler vehicles 20 along a scan path during an ultrasonic inspection. The motion control application software 92 sends commands based on feedback from a position measurement system 84 that tracks the locations of the crawler vehicles 20. The feedback from the position measurement system 84 is also provided to an ultrasonic pulser/receiver 96, which may be connected to the ultrasonic transducer array 88 on crawler vehicle 20 via an electrical cord or cable or wirelessly.

Still referring to FIG. 27, the ultrasonic pulser/receiver 96 sends the encoder pulses to the NDI scan application software 94. The NDI scan application software 94 uses the encoder values to position the scan data in the proper location. The control computer 90 hosts ultrasonic data acquisition and display software that controls the ultrasonic pulser/receiver 96. The ultrasonic pulser/receiver 96 in turn sends pulses to and receives return signals from the ultrasonic transducer array 88. The NDI scan application software 94 controls all details of the scan data and the display of data, including the stitching of data acquired during adjacent sweeps of an ultrasonic transducer array 88.

The position measurement system 84 is configured to acquire position data representing the initial coordinate position of each of the crawler vehicles 20 relative to a coordinate system (i.e., frame of reference) of the wind turbine blade 108. Once the initial coordinate position of each of the crawler vehicles 20 has been determined, the data acquired by the rotation encoders 48 (see FIG. 26) can be used to track each incremental movement away or toward the initial coordinate positions. This enables the control computer 90 to track the positions of the ultrasonic transducer array 88 carried by each crawler vehicle 20 during ultrasonic inspection.

The position measurement system 84 may be further configured to acquire cart position data representing the initial coordinate position of the maintenance cart 18 relative to a coordinate system (i.e., frame of reference) of the wind turbine blade 108. Once the initial coordinate position of the maintenance cart 18 has been determined, the data acquired by a cart wheel rotation encoder (not shown in FIG. 27) can be used to track each incremental movement away or toward the initial coordinate position. This enables the control computer 90 to track the spanwise position of the maintenance cart 18 during the performance of a maintenance operation by a maintenance tool being carried by the maintenance cart 18 as opposed to the crawler vehicle 20.

The position measurement system 84 may take many different forms. For example, the position measurement system 84 may include a string encoder mounted on the maintenance cart 18. The string encoder includes a string having one end which may be attached to a string encoder attachment device fixedly coupled to the root of the wind turbine blade 108. The string encoder can be used to measure the distance of the maintenance cart 18 from the hub 106, which in turn enables determination of the spanwise position of the maintenance cart 18 on the wind turbine blade 108.

By virtue of the geometry of the maintenance cart 18 and relative wheel locations, the position of one horizontal point on the maintenance cart 18 (for example, a target viewed by a laser distance meter at the root end of the wind turbine blade 108) is all that is needed for X positioning. For Y positioning, a linear encoder (optical or physical) between a cart location and the trailing edge 112 will provide Y position, which would vary only slightly due to how the maintenance cart 18 sits on the trailing edge 112. If there is a "hard stop" seating of the maintenance cart 18 on the trailing edge 112, this will always be the same, and no Y encoding is needed. All wheel locations will be known relative to the horizontal and vertical datum, and inspection data from each wheel probe can be mapped onto a two-dimensional space accordingly.

In accordance with an alternative embodiment, the position measurement system 84 may include a laser range meter mounted on the hub 106 of the wind turbine 100 and an optical target (e.g., a retroreflector) mounted on the maintenance cart 18 (or vice versa). The control computer 90 may be programmed to control operation of the laser range meter and receive range data therefrom for wireless transmission to a control station. Measurement data from the laser range meter can be used to obtain estimates of the distance from the laser range meter to the optical target, which distance can be used to compute the spanwise position of the maintenance cart 18 in the frame of reference of the wind turbine blade 108. A typical laser range meter comprises a laser diode which transmits a bundled, usually visible, laser beam toward the optical target. The light which is backscattered and/or reflected by the optical target is imaged on the active surface of a photoreceiver by receiving optics. The photoreceiver has a position and an orientation which are fixed relative to the position and orientation of the laser diode. The time-of-flight between transmission and reception of the light can be used to calculate the distance between the laser range meter and the optical target. Alternatively, a distance meter which directionally projects wave energy other than a laser beam could be utilized.

In accordance with a further embodiment, the position measurement system 84 may include closed-loop feedback control using a motion capture system of the type disclosed in detail in U.S. Pat. No. 7,643,893. In accordance with one embodiment, the motion capture system is configured to measure the spanwise position of the maintenance cart 18 as the maintenance cart 18 operates within a control volume. A processor receives the measured motion characteristics from the motion capture system and determines a control signal based on the measured motion characteristics. A position control system receives the control signal and continuously adjusts the cart motion to maintain or achieve a desired motion state. The maintenance cart 18 may be equipped with optical targets in the form of passive retro-reflective markers. The motion capture system, the processor, and the position control system comprise a complete closed-loop feedback control system.

In addition, the structure and operation of a system that uses optical motion capture hardware for position and orientation tracking of end effectors (e.g., NDI sensors) are disclosed in detail in U.S. Pat. No. 8,892,252. In accordance with a basic system configuration for a motion capture-based tracking method, multiple motion capture cameras (at least two) are set up around a wind turbine blade 108 to create a three-dimensional capture volume that captures motion for all six degrees-of-freedom (6-DoF) of the maintenance cart 18. Preferably the maintenance cart 18 has a group of passive retro-reflective markers (at least three) attached thereto and arranged in a unique pattern. Each motion capture camera can be a video camera of the type comprising a ring of light-emitting diodes (LEDs) surrounding a camera lens. In conjunction with such cameras, each retro-reflective marker may comprise a hemispherical or ball-shaped body coated with retro-reflective paint that reflects impinging light from the LEDs of each camera back toward the associated lens of the respective camera. The motion capture system utilizes data captured from image sensors inside the cameras to triangulate the three-dimensional position of the target object between multiple cameras configured to provide overlapping projections. The motion capture processor collects real-time image information from all of the motion capture cameras, processes the image data, and sends the information along a dedicated connection to a motion tracking and applications computer. At each frame update, the positions of all of the passive markers in the capture volume can be captured by each camera and converted by the motion capture processor into three-dimensional coordinates, resulting in a full 6-DoF position and orientation representation for the maintenance cart 18.

In the specific application described in this disclosure, the motion capture cameras can be placed at any one of the following locations: (a) on a self-supporting structure; (b) on the nacelle 104 of the wind turbine 100; (c) on wind turbine blades other than the wind turbine blade undergoing the maintenance procedure; (d) on the tower 102; and (e) on the maintenance cart 18 pointed back at passive markers attached near the hub 106 of the wind turbine 100.

The apparatus disclosed herein can be adapted for use in the automation of various maintenance functions, including but not limited to non-destructive inspection, drilling, grinding, fastening, applique application, scarfing, ply mapping, marking, cleaning and painting. In cases where the end effector is a rotary tool (such as a scarfer, drill, deburrer or reamer), when the rotary tool reaches a target position, the computer system can be programmed to activate the end effector motor (not shown in drawings) via a motor controller to drive rotation of the rotary tool.

While apparatuses and methods for performing automated maintenance operations on an airfoil-shaped body using a trailing edge-following maintenance cart have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit. For example, one form of a computer system disclosed above is the combination of a processor or control computer (a.k.a. controller) and one or more motor controllers, wherein the processor or control computer communicates with the one or more motor controllers. In the above-disclosed embodiments, the computer system is configured/programmed to send commands to the motor controllers for controlling the movements of the cart and the crawlers.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. An apparatus comprising:
a backbone structure;
a suspension system comprising first through fourth suspension arms which are non-articulated and fixedly coupled to and extending downward from the backbone structure;
first through fourth stabilizing wheels respectively supported by and rotatable relative to the first through fourth suspension arms; and
a motor operatively coupled to drive rotation of the first stabilizing wheel,
wherein the first through fourth stabilizing wheels are arranged relative to the backbone structure in a configuration such that the first and third stabilizing wheels would contact and be rollable on one side of an airfoil-shaped body and the second and fourth stabilizing wheels would contact and be rollable on another side of the airfoil-shaped body while the suspension system suspends the backbone structure over a generally horizontal trailing edge of the airfoil-shaped body.

2. The apparatus as recited in claim 1, comprising first through fourth multiplicities of wheels, wherein the first through fourth stabilizing wheels are respectively included in the first through fourth multiplicities of wheels, and the suspension system comprises
first through fourth multiplicities of rocker arms respectively rotatably coupled to the first through fourth suspension arms, the first through fourth multiplicities of wheels being respectively rotatably coupled to the first through fourth multiplicities of rocker arms.

3. The apparatus as recited in claim 1, further comprising:
first and second NDI sensor unit supports rotatably coupled to the backbone structure; and
first and second NDI sensor units respectively fixedly coupled to the first and second NDI sensor unit supports.

4. The apparatus as recited in claim 1, wherein the first stabilizing wheel is a wheel probe.

5. The apparatus as recited in claim 1, further comprising:
a cable spool rotatably coupled to the backbone structure;
a spool motor mounted to the backbone structure and operatively coupled to drive rotation of the cable spool;
a cable having a portion wound on the cable spool; and
a crawler vehicle attached to one end of the cable, the crawler vehicle comprising a frame, a set of wheels rotatably coupled to the frame, at least one vacuum adherence device coupled to the frame, and a maintenance tool carried by the frame.

6. The apparatus as recited in claim 1, further comprising:
a cable having one end attached to the backbone structure; and
a crawler vehicle attached to the cable, the crawler vehicle comprising:
a frame;
a set of wheels rotatably coupled to the frame;
at least one vacuum adherence device coupled to the frame;
a maintenance tool carried by the frame;
a cable spool rotatably coupled to the frame; and
a spool motor mounted to the frame and operatively coupled to drive rotation of the cable spool.

7. The apparatus as recited in claim 1, wherein the backbone structure comprises a truss bridge.

8. The apparatus as recited in claim 1, wherein the suspension system further comprises:
first and second rocker arms respectively rotatably coupled to the first and second suspension arms, the first and
second stabilizing wheels being respectively rotatably coupled to the first and second rocker arms; and
first and second rocker helical torsion springs which are arranged to respectively assist rotations of the first and second rocker arms that would cause the first and second stabilizing wheels to respectively move toward each other.

9. The apparatus as recited in claim 8, wherein the suspension system further comprises:
a standoff support frame rotatably coupled to the first rocker arm;
a sensor affixed to the standoff support frame;
a standoff wheel rotatably coupled to the standoff support frame,
wherein the sensor is separated from a plane that is tangent to both the first stabilizing wheel and the standoff wheel by a standoff distance.

10. The apparatus as recited in claim 8, further comprising first and second vertical wheels, wherein the suspension system further comprises:
third and fourth rocker arms rotatably coupled to the backbone structure, the first and second vertical wheels being rotatably coupled to the third and fourth rocker arms respectively; and
third and fourth rocker helical torsion springs which are arranged to respectively assist rotations of the third and fourth rocker arms that would cause the first and second vertical wheels to move away from the backbone structure.

11. The apparatus as recited in claim 10, wherein each of the first and second vertical wheels is a respective wheel having an annular groove configured to receive a portion of the trailing edge of the airfoil-shaped body.

12. An apparatus comprising:
a backbone structure;
first and second vertical wheels;
a suspension system comprising first through fourth suspension arms fixedly coupled to and extending downward from the backbone structure;
first through fourth stabilizing wheels respectively supported by and rotatable relative to the first through fourth suspension arms; and
a motor operatively coupled to drive rotation of the first stabilizing wheel,
wherein the first through fourth stabilizing wheels are arranged relative to the backbone structure in a configuration such that the first and third stabilizing wheels would contact and be rollable on one side of an airfoil-shaped body and the second and fourth stabilizing wheels would contact and be rollable on another side of the airfoil-shaped body while the suspension system suspends the backbone structure over a generally horizontal trailing edge of the airfoil-shaped body; and
wherein the suspension system further comprises:
first and second rocker arms respectively rotatably coupled to the first and second suspension arms, the first and second stabilizing wheels being respectively rotatably coupled to the first and second rocker arms;

first and second rocker helical torsion springs which are arranged to respectively assist rotations of the first and second rocker arms that would cause the first and second stabilizing wheels to respectively move toward each other;

third and fourth rocker arms rotatably coupled to the backbone structure, the first and second vertical wheels being rotatably coupled to the third and fourth rocker arms respectively; and third and fourth rocker helical torsion springs which are arranged to respectively assist rotations of the third and fourth rocker arms that would cause the first and second vertical wheels to move away from the backbone structure.

13. The apparatus as recited in claim 12, wherein each of the first and second vertical wheels is a respective wheel having an annular groove configured to receive a portion of the trailing edge of the airfoil-shaped body.

14. The apparatus as recited in claim 12, comprising first through fourth multiplicities of wheels, wherein the first through fourth stabilizing wheels are respectively included in the first through fourth multiplicities of wheels, and the suspension system comprises first through fourth multiplicities of rocker arms respectively rotatably coupled to the first through fourth suspension arms, the first through fourth multiplicities of wheels being respectively rotatably coupled to the first through fourth multiplicities of rocker arms.

15. The apparatus as recited in claim 12, wherein the suspension system further comprises:
a standoff support frame rotatably coupled to the first rocker arm;
a sensor affixed to the standoff support frame;
a standoff wheel rotatably coupled to the standoff support frame,
wherein the sensor is separated from a plane that is tangent to both the first stabilizing wheel and the standoff wheel by a standoff distance.

16. The apparatus as recited in claim 12, further comprising:
first and second NDI sensor unit supports rotatably coupled to the backbone structure; and
first and second NDI sensor units respectively fixedly coupled to the first and second NDI sensor unit supports.

17. The apparatus as recited in claim 12, wherein the first stabilizing wheel is a wheel probe.

18. The apparatus as recited in claim 12, further comprising:
a cable spool rotatably coupled to the backbone structure;
a spool motor mounted to the backbone structure and operatively coupled to drive rotation of the cable spool;
a cable having a portion wound on the cable spool; and
a crawler vehicle attached to one end of the cable, the crawler vehicle comprising a frame, a set of wheels rotatably coupled to the frame, at least one vacuum adherence device coupled to the frame, and a maintenance tool carried by the frame.

19. The apparatus as recited in claim 12, further comprising:
a cable having one end attached to the backbone structure; and
a crawler vehicle attached to the cable, the crawler vehicle comprising:
a frame;
a set of wheels rotatably coupled to the frame;
at least one vacuum adherence device coupled to the frame;
a maintenance tool carried by the frame;
a cable spool rotatably coupled to the frame; and
a spool motor mounted to the frame and operatively coupled to drive rotation of the cable spool.

20. An apparatus comprising:
a backbone structure;
first and second vertical wheels;
a suspension system comprising first through fourth suspension arms fixedly coupled to and extending downward from the backbone structure;
first through fourth stabilizing wheels respectively supported by and rotatable relative to the first through fourth suspension arms; and
a motor operatively coupled to drive rotation of the first stabilizing wheel,
wherein the first through fourth stabilizing wheels are arranged relative to the backbone structure in a configuration such that the first and third stabilizing wheels would contact and be rollable on one side of an airfoil-shaped body and the second and fourth stabilizing wheels would contact and be rollable on another side of the airfoil-shaped body while the suspension system suspends the backbone structure over a generally horizontal trailing edge of the airfoil-shaped body; and
wherein the suspension system further comprises:
first and second rocker arms rotatably coupled to the backbone structure, the first and second vertical wheels being rotatably coupled to the first and second rocker arms respectively; and
first and second rocker helical torsion springs which are arranged to respectively assist rotations of the first and second rocker arms that would cause the first and second vertical wheels to move away from the backbone structure.

21. The apparatus as recited in claim 20, wherein each of the first and second vertical wheels is a respective wheel having an annular groove configured to receive a portion of the trailing edge of the airfoil-shaped body.

22. The apparatus as recited in claim 20, wherein the backbone structure comprises a truss bridge.

\* \* \* \* \*